(12) United States Patent
Handler et al.

(10) Patent No.: US 12,186,740 B2
(45) Date of Patent: Jan. 7, 2025

(54) KITS COMPRISING CONTAINERS WITH AT LEAST ONE SOLID CATALYTICALLY ACTIVE COMPOUND, AND THEIR USES IN SOLID STATE REACTION

(71) Applicant: RD&C Research, Development & Consulting GmbH, Vienna (AT)

(72) Inventors: Norbert Handler, Vienna (AT); Helmut Buschmann, Aachen (DE)

(73) Assignee: RD&C Research, Development & Consulting GmbH, Vienna (AT)

( * ) Notice: Subject to any disclaimer, the term of this patent is extended or adjusted under 35 U.S.C. 154(b) by 516 days.

(21) Appl. No.: 17/058,346

(22) PCT Filed: May 24, 2019

(86) PCT No.: PCT/EP2019/063506
§ 371 (c)(1),
(2) Date: Nov. 24, 2020

(87) PCT Pub. No.: WO2019/224368
PCT Pub. Date: Nov. 28, 2019

(65) Prior Publication Data
US 2021/0197181 A1    Jul. 1, 2021

(30) Foreign Application Priority Data
May 25, 2018 (EP) ..................... 18174418

(51) Int. Cl.
*B01J 27/04* (2006.01)
*B01J 21/08* (2006.01)
*B01J 23/04* (2006.01)
*B01J 23/34* (2006.01)
*B01J 27/06* (2006.01)
*B01J 35/00* (2024.01)

(52) U.S. Cl.
CPC ............... *B01J 27/04* (2013.01); *B01J 21/08* (2013.01); *B01J 23/04* (2013.01); *B01J 23/34* (2013.01); *B01J 27/06* (2013.01); *B01J 35/00* (2013.01)

(58) Field of Classification Search
CPC ............ B01J 21/08; B01J 23/04; B01J 35/00
See application file for complete search history.

(56) References Cited

FOREIGN PATENT DOCUMENTS

CN    101531948 A  *  9/2009

OTHER PUBLICATIONS

Silicycle SiliBond Specification Sheet (Year: 2009).*
GFS Chemicals Silica Gel 60-200 Mesh SDS (Year: 2015).*
West India (Potassium Permanganate Impregnated Alumina, West India, 2015) (Year: 2015).*

(Continued)

*Primary Examiner* — Colin W. Slifka
*Assistant Examiner* — Logan Edward Laclair
(74) *Attorney, Agent, or Firm* — Millen, White, Zelano & Branigan, P.C.; Brion P. Heaney

(57) ABSTRACT

Subject matter of the present invention are kits comprising containers with at least one solid catalytically active compound, their uses in processes for simulating and predicting the transformation of a compound that is preferably a solid active pharmaceutical ingredient (API), preferably an API in combination with an excipient, in a shortened time span, into the respective degradation product(s).

14 Claims, 10 Drawing Sheets

(56) References Cited

OTHER PUBLICATIONS

SiliaBond (SiliaBond® Potassium Permanganate, Silicycle®, 2009) (Year: 2009).*
Patrick et al (The Behavior of Silica Gel Towards Certain Alkalies and Salts in Aqueous Solution, 2002) (Year: 2002).*
Auta et al (Fixed-bed column. adsorption of carbon dioxide by sodium hydroxide modified activated alumina, Chemical Engineering Journal, 2013) (Year: 2013).*
Mecadon et al (Potassium Hydroxide Impregnated Alumina (KOH-Alumina) as a Recyclable Catalyst for the Solvent-Free Multicomponent Synthesis of Highly Functionalized Substituted Pyridazines and/or Substituted Pyridazin-3(2H)-ones under Microwave Irradiation, National Library of Medicine, 2011) (Year: 2011).*
Millipore Sigma et al (2% KOH Coated Silica Gel, Millipore Sigma, 2020 (earliest date recorded, but likely was publicly available earlier) (Year: 2020).*
Regio et al (Sulfuric acid on silica-gel: an inexpensive catalyst for aromatic nitration, Tetrahedron Letters, 1996) (Year: 1996).*
Mirjalili et al (Deprotection of Acetals and Ketals by Silica Sulfuric Acid and Wet $SiO_2$, Molecules, 2002) (Year: 2002).*
International Search Report for PCT/EP2019/063506 dated Aug. 27, 2019.
SiliCycle Inc: Silicycle Specification Sheet Siliabond Potassium Permanganate nec Product No. R23030B, Aug. 5, 2009.
Jiuzhou: "Shangai Jiuzhou Chemicals Product Catalog," Jun. 14, 2017, XP055540388.
Juan M. Riego et al., "Sulfuric Acid on Silica-gel: an inexpensive catalyst for aromatic nitration" Tetrahedron Letters, vol. 37, No. 4, Jan. 1, 1996, XP055540542.

* cited by examiner

| DP | 1 | 2 | 3 | 4 | 5 | 6 | 7 | 8 |
|---|---|---|---|---|---|---|---|---|
| Condition | Al | N, Al | N*, Al | N | A, N, Al | N | N | Al |
| Solid form | Am,P1,P2 | Am,P1,P2 | Am,P1,P2 | Am | Am,P1,P2 | Am | Am | Am,P1,P2 |

KITS COMPRISING CONTAINERS WITH AT LEAST ONE SOLID CATALYTICALLY ACTIVE COMPOUND, AND THEIR USES IN SOLID STATE REACTION

Subject matter of the present invention are kits comprising containers with at least one solid catalytically active compound, their uses in processes for simulating and predicting the transformation of a compound that is preferably a solid active pharmaceutical ingredient (API), preferably an API with an API or an excipient with an excipient, more preferably an API in combination with an excipient in a shortened time span, into the respective degradation product(s).

API is the part of any drug on the market or under development, that produces its effects. In general, all drugs are made at least up of two core components: the API, that is the central ingredient, and the excipient, the substance other than the drug, that helps the medicine deliver to the system. API is the pharmacologic active component, whereas the excipients are pharmacologically inactive. API or API classes comprise any compounds referenced in "Martindale. The Complete Drug Reference; 39th edition, 2017; Pharmaceutical Press; ISBN 978 0 85711 309 2" and following editions, and any API under development.

BACKGROUND OF THE INVENTION

Looking into the transformation of solid materials over time is one key element of material science. The current invention is drawn to providing a method with which to capture or simulate the effects the immediate environment has on a solid structure in a shortened/accelerated time span. One of the cores of the invention is the simulation of such effects/changes without involving additional fluids like solvents (or at least only at a very marginal degree). The invention is mostly focused on chemical solids (or mixtures thereof) including inorganic substances like salts, pure metals or alloys, as well as organic substances like polymers, protein structures, DNA-crystals, or small organic molecules as well as pharmaceutical excipients to name but a few. One of the most important classes of solid chemical substances or especially mixtures thereof on which the method of the invention can be used most effectively are pharmaceutical solid formulations. Pharmaceutical solid formulations are complex, multicomponent mixtures showing complex reaction and degradation pathways. Solid forms of drugs and medicinal products i.e. tablets, dragées, pills, capsules, powders, etc. account by far for the majority of drugs prescribed by physician or sold over-the-counter in pharmacies (covering more than 80% of the pharmaceutical global market). Despite looking fairly stable and inert to chemical reactions, they are in fact multi-component and multi-phase systems, which should provide a complex but stable matrix, however, over the time instability is induced by morphological changes, interface reactions, elemental or other impurities or external factors triggered by the packaging material or environment (light, oxygen, etc.). In fact, the majority of pharmaceutical companies face massive problems to solve solid phase related stability issues early in the drug development process due to lack of reliable prediction and evaluation tools. The pharmaceutical industry does make use of the scientific expertise at research institutes and universities to answer principal questions and to obtain a better understanding of solid phase reactions, however, the focus of such purely research-based approaches is often not suitable to answer questions from a drug developmental point of view. In addition, the tests used and known so far are highly time-consuming causing major delays.

In general, experimental setups for industry need to be easy, robust, feasible, scalable and flexible and also repeatable (i.e. different formulations, dosage forms, polymorphs, etc.) and must deliver reproducible results. The aim of the current invention was to identify a versatile strategy for minimizing risks to simplify the experimental setup, standardize and reduce potential influencing factors by mimicking the reaction conditions in a solid phase system. It is also drawn to using the solid phase instead of solution phase to obtain more realistic results with a high-quality impact defining shelf-life limits, storage conditions and specification limits.

Subject matter of the present invention is the provision of kits comprising containers with at least one solid catalytically active compound, their uses in processes for simulating and predicting the transformation of a compound that is preferably a solid active pharmaceutical ingredient (API), preferably an API in combination with an excipient, in a shortened time span, into the respective degradation product(s).

The processes and kits according to the present invention maybe further used
- for predicting the stability of a API, excipient or API-excipient mixture
- for predicting the shelf-life of a formulation
- for predicting API-excipient compatibility
- for predicting degradation profiles of APIs, excipients and formulations
- for predicting of polymorph changes
- for predicting compatibility of packaging material The main characteristics of the current invention is that it allows easy to use flexible operations, simulation of various conditions in a highly predictive manner, the possibility to execute cross experiments for optimizing data output with a minimized experimental matrix and lower material usage. Most importantly, the process according to the invention gives fast, reliable and repeatable results for drug development and manufacturing processes using much lower amounts of material compared to the methods described so far. It allows efficient evaluation and simulation of solid state reactions as service platform for the pharmaceutical industry and is applicable at various stages of the drug development process in a highly flexible way resulting faster drug development with optimized outcome and lower failure rates.

Subject matter of the present invention is a kit comprising the following components:
- a container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% (w/w) sulfuric acid or chlorosulfonic acid on silica gel, and/or
- a container comprising a catalyst that is 3-15% (w/w) KOH or NaOH absorbed on silica gel, preferably 3-10% (w/w) KOH or NaOH absorbed on silica gel or alox, more preferably about 5% (w/w) KOH or NaOH on silica gel or alox, and
- a container comprising a catalyst that is 3-15% (w/w) $KMnO_4$ absorbed on silica gel or alox, preferably 3-10% (w/w) $KMnO_4$ absorbed on silica gel or alox, more preferably about 5% (w/w) $KMnO_4$ on silica gel or alox, and
- optionally a container comprising a neutral catalyst that is pure silica gel 60 (70-230 mesh) or that is pure alox.

Subject matter of the present invention is a kit comprising the following components:
- a container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% (w/w) sulfuric acid or chlorosulfonic acid on silica gel, and
- a container comprising a catalyst that is 3-15% (w/w) KOH or NaOH absorbed on silica gel, preferably 3-10% (w/w) KOH or NaOH absorbed on silica gel or alox, more preferably about 5% (w/w) KOH or NaOH on silica gel or alox, and
- a container comprising a catalyst that is 3-15% (w/w) $KMnO_4$ absorbed on silica gel or alox, preferably 3-10% (w/w) $KMnO_4$ absorbed on silica gel or alox, more preferably about 5% (w/w) $KMnO_4$ on silica gel or alox, and
- a container comprising a neutral catalyst that is pure silica gel 60 (70-230 mesh) or that is pure alox.

Subject matter of the present invention is a kit as described above comprising the following component:
Container comprising a catalyst that is 3-15% (w/w) $KMnO_4$ absorbed on alox, preferably 3-10% (w/w) $KMnO_4$ absorbed on alox, more preferably about 5% (w/w) $KMnO_4$ on alox.

Subject matter of the present invention is a kit as described above comprising the following component:
Container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel.

Subject matter of the present invention is a kit as described above comprising the following component:
Container comprising a catalyst that is 3-15% (w/w) NaOH absorbed on silica gel, preferably 3-10% (w/w) NaOH absorbed on silica gel, more preferably about 5% (w/w) NaOH on silica gel Subject matter of the present invention is a kit as described above comprising the following component:
Container comprising a catalyst that is 3-15% (w/w) NaOH absorbed on alox, preferably 3-10% (w/w) NaOH absorbed on alox, more preferably about 5% (w/w) NaOH on alox Subject matter of the present invention is a kit as described above comprising the following component:
Container comprising a catalyst that is 3-15% (w/w) KOH absorbed on silica gel, preferably 3-10% (w/w) KOH absorbed on silica gel, more preferably about 5% (w/w) KOH on silica gel.

Subject matter of the present invention is a kit as described above comprising the following component:
Container comprising a catalyst that is 3-15% (w/w) KOH absorbed on alox, preferably 3-10% (w/w) KOH absorbed on alox, more preferably about 5% (w/w) KOH on alox Subject matter of the present invention is a kit as described above comprising the following component:
Container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel.

Subject matter of the present invention is a kit as described above comprising the following component:
Container comprising a catalyst that is 3-15% (w/w) chlorosulfonic acid absorbed on silica gel 60 (70-230 mesh), preferably 3-10% (w/w) chlorosulfonic acid absorbed on silica gel, more preferably about 5% (w/w) chlorosulfonic acid on silica gel.

Subject matter of the present invention is a kit as described above additionally comprising the following components:
Container comprising a catalyst that is 3-15% (w/w) $K_2Cr_2O_7$ absorbed on silica gel, preferably 3-10% (w/w) $K_2Cr_2O_7$ absorbed on silica gel, more preferably about 5% (w/w) $K_2Cr_2O_7$ on silica gel Subject matter of the present invention is a kit as described above additionally comprising the following components:
Container comprising a catalyst that is 3-15% (w/w) $KMnO_4$ absorbed on silica gel or alox, preferably 3-10% (w/w) $KMnO_4$ absorbed on silica gel or alox, more preferably about 5% (w/w) $KMnO_4$ on silica gel or alox, and
Container comprising a catalyst that is 3-15% (w/w) $K_2Cr_2O_7$ absorbed on silica gel, preferably 3-10% (w/w) $K_2Cr_2O_7$ absorbed on silica gel, more preferably about 5% (w/w) $K_2Cr_2O_7$ on silica gel Subject matter of the present invention is a kit as described above comprising the following components:
a container comprising a neutral catalyst that is pure silica gel 60 (70-230 mesh).

Subject matter of another embodiment of the present invention is a kit as described above comprising the following components:
a container comprising a neutral catalyst that is pure alox.

Subject matter of the present invention is furthermore the use of any of the above described kits in a mechanochemical process for simulating and predicting the resulting degradation products of a compound that is preferably a solid active pharmaceutical ingredient (API), preferably an API with an API or an excipient with an excipient, more preferably an API in combination with an excipient. As above outlined kits according to the present invention may be further used
- for predicting the stability of a API, excipient or API-excipient mixture
- for predicting the shelf-life of a formulation
- for predicting API-excipient compatibility
- for predicting degradation profiles of APIs, excipients and formulations
- for predicting of polymorph changes
- for predicting compatibility of packaging material In a particular embodiment said kits may be used for any of the above outlined processes and uses wherein said API is an API with carboxylic acid, sulfonic acid or esters thereof, preferably selected from the group comprising Clopidogrel bisulfate, acetyl salicylic acid, benzocaine, procaine, atropine, or is an APIs with prodrug esters (e.g. candesartan cilexetil, cefpodoxim proxetil, adefovir dipivoxil). In a particular embodiment of the before-mentioned use the kit comprises the following components:
- a container comprising a catalyst that is 3-15% (w/w) NaOH absorbed on silica gel, preferably 3-10% (w/w) NaOH absorbed on silica gel, more preferably about 5% NaOH on silica gel, and
- a container comprising a catalyst that is 3-15% (w/w) $KMnO_4$ absorbed on silica gel, preferably 3-10% (w/w) $KMnO_4$ absorbed on silica gel, more preferably about 5% $KMnO_4$ on silica gel.

In a particular embodiment said kits may be used for any of the above outlined processes and uses wherein said API is an API with amide function, preferably selected from the group comprising Paracetamol, chloramphenicol, indomethacine, lidocaine.

In a particular embodiment of the before-mentioned use wherein said API is an API with carboxylic acid, sulfonic acid or esters thereof the kit comprises the following components:
- a container comprising a catalyst that is 3-15% (w/w) NaOH absorbed on silica gel, preferably 3-10% (w/w) NaOH absorbed on silica gel, more preferably about 5% NaOH on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% KMnO$_4$ on silica gel.

In a particular embodiment of the before-mentioned use wherein said API is an API with carboxylic acid, sulfonic acid or esters thereof the kit comprises the following components:
- a container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% sulfuric acid or chlorosulfonic acid on silica gel, and
- a container comprising a catalyst that is 3-15% (w/w) NaOH absorbed on silica gel, preferably 3-10% (w/w) NaOH absorbed on silica gel, more preferably about 5% (w/w) NaOH on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel, and
- a container comprising a neutral catalyst that is pure silica gel 60 (70-230 mesh) or that is pure alox.

In a particular embodiment said kits may be used for any of the above outlined processes and uses wherein said API is an API with an amine function, preferably secondary or tertiary amines, selected from the group comprising citalopram, fluoxetine, primaquine, nifedipine, duloxetine. In a particular embodiment of the before-mentioned use wherein said API is an API with an amine function the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel or alox, more preferably about 5% (w/w) KMnO$_4$ on silica gel.

In a particular embodiment of the before-mentioned use wherein said API is an API with an amine function the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel or alox, more preferably about 5% (w/w) KMnO$_4$ on silica gel and
- a container comprising a neutral catalyst that is pure silica gel 60 (70-230 mesh) or that is pure alox.

In a particular embodiment said kits may be used for any of the above outlined processes and uses wherein said API is an API with hydroxyl function in form of an ester, ether, alcohol or phenol preferably selected from the group comprising diflunisal, paracetamol, epinephrine, quercetin, resveratrol, cholesterol. In a particular embodiment of the before-mentioned use the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel In a particular embodiment said kits may be used for any of the above outlined processes and uses wherein said API is an API with unsaturated bonds, conjugated systems or aromatic systems preferably selected from the group comprising paracetamol, acetyl salicylic acid, resveratrol, colecalciferol, nifedipine, simvastatine. In a particular embodiment of the before-mentioned use the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel.

In a particular embodiment said kits may be used for any of the above outlined processes and uses wherein said API is an API with an indole ring, preferably selected from the group comprising indomethacine, serotonine, melatonine, strychnine, methylergometrine, lysergic acid. In a particular embodiment of the before-mentioned use the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel In a particular embodiment said kits may be used for any of the above outlined processes and uses wherein said API is an API with barbituric acids (imides), preferably selected from the group comprising Phenobarbital, hexobarbital, amobarbital, pentobarbital.

In a particular embodiment of the before-mentioned use wherein said API is an API with barbituric acids (imides) the kit comprises the following components:
- a container comprising a neutral catalyst that is pure silica gel 60 (70-230 mesh). and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel In a particular embodiment of the before-mentioned use wherein said API is an API with barbituric acids (imides) the kit comprises the following components:

a container comprising a catalyst that is 3-15% (w/w) NaOH absorbed on silica gel, preferably 3-10% (w/w) NaOH absorbed on silica gel, more preferably about 5% NaOH on silica gel, and a container comprising a catalyst that is 3-15% (w/w) $KMnO_4$ absorbed on silica gel, preferably 3-10% (w/w) $KMnO_4$ absorbed on silica gel, more preferably about 5% $KMnO_4$ on silica gel, and a container comprising a neutral catalyst that is pure silica gel 60 (70-230 mesh) or that is pure alox.

In a particular embodiment said kits may be used for any of the above outlined processes and uses wherein said API is a prazoles (various functional groups) selected from the group comprising Omeprazole, pantoprazole, rabeprazole, ilaprazole.

In a particular embodiment of the before-mentioned use wherein said API is a prazoles the kit comprises the following components:

a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid absorbed on silica gel, and a container comprising a catalyst that is 3-15% (w/w) NaOH absorbed on silica gel, preferably 3-10% (w/w) NaOH absorbed on silica gel, more preferably about 5% (w/w) NaOH on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel In a particular embodiment of the before-mentioned use wherein said API is a prazoles the kit comprises the following components:

a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid absorbed on silica gel, and a container comprising a catalyst that is 3-15% (w/w) NaOH absorbed on silica gel, preferably 3-10% (w/w) NaOH absorbed on silica gel, more preferably about 5% (w/w) NaOH on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel, and a container comprising a neutral catalyst that is pure silica gel 60 (70-230 mesh) or that is pure alox.

In a particular embodiment said kits may be used for any of the above outlined processes and uses wherein said API is a morphinane (various functional groups) selected from the group comprising Morphine, codeine, hydromorphone, naloxone, etc.)

In a particular embodiment of the before-mentioned use wherein said API is a morphinane the kit comprises the following components:

a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel In a particular embodiment of the before-mentioned use wherein said API is a morphinane the kit comprises the following components:

a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel, and a container comprising a neutral catalyst that is pure silica gel 60 (70-230 mesh) or that is pure alox.

In a particular embodiment said kits may be used for any of the above outlined processes and uses wherein said API is a ACE inhibitors (various functional groups) selected from the group comprising e.g. captopril, ramipril, enalapril, Lisinopril.

In a particular embodiment of the before-mentioned use wherein said API is a ACE inhibitors the kit comprises the following components:

a container comprising a catalyst that is 3-15% (w/w) NaOH absorbed on silica gel, preferably 3-10% (w/w) NaOH absorbed on silica gel, more preferably about 5% (w/w) NaOH on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel In a particular embodiment of the before-mentioned use wherein said API is a ACE inhibitors the kit comprises the following components:

a container comprising a catalyst that is 3-15% (w/w) NaOH absorbed on silica gel, preferably 3-10% (w/w) NaOH absorbed on silica gel, more preferably about 5% (w/w) NaOH on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel a container comprising a neutral catalyst that is pure silica gel 60 (70-230 mesh) or that is pure alox.

In a particular embodiment said kits maybe used for any of the above outlined processes and uses wherein said API is a statine (various functional groups) selected from the group comprising atorvastatine, fluvastatine, lovastatine, pravastatine, rosuvastatine, simvastatine.

In a particular embodiment of the before-mentioned use wherein said API is a statine the kit comprises the following components:

a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel.

In a particular embodiment of the before-mentioned use wherein said API is a statine the kit comprises the following components:

a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and a container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel, and a container comprising a neutral catalyst that is pure silica gel 60 (70-230 mesh) or that is pure alox.

In a particular embodiment said kits may be used for any of the above outlined processes and uses wherein said API is a high molecular compound, preferably a peptide or protein based API.

In a particular embodiment said kits may be used for any of the above outlined processes and uses wherein said excipient is a low molecular or high molecular compound, preferably an organic excipient.

In a particular embodiment said kits may be used for any of the above outlined processes and uses wherein said excipient is lactose.

In a particular embodiment said kits may be used for any of the above outlined processes and uses wherein said excipient is an aldehyde containing excipient (carbohydrates, esp. lactose, glucose).

In a particular embodiment said kits may be used for any of the above outlined processes and uses wherein said excipient is prone to contain or form peroxides, preferably selected from the group comprising PEG, Povidone, polysorbate.

In a particular embodiment said kits may be used for any of the above outlined processes and uses wherein said excipient is a (semi-)liquid excipients, preferably selected from the group comprising PEG, polysorbate, fatty acids and derivatives, emulsifier.

Subject matter of the present invention is a mechanochemical process for simulating and predicting the transformation of a compound that is preferably a solid active pharmaceutical ingredient (API), preferably an API in combination with an excipient, in a shortened time span, into the respective degradation product comprising the following steps:

a. Providing a kit according to the present invention,
b. Exposing said compound that is preferably a solid active pharmaceutical ingredient (API), preferably an API in combination with an excipient, to said mechanochemical process, preferably a ball mill process, wherein the stoichiometric ratio of API:catalyst (weight stoichiometry) is 1:1 to 20, preferably about 1:10.
c. Analyzing the degradation products.

Subject matter of the present invention is in one embodiment of the invention a mechanochemical, wherein the reaction time of said process is between 10-90 minutes, preferably 15-60 minutes.

Subject matter of the present invention is in one embodiment of the invention a mechanochemical process, wherein the frequency of said ball mill is between 5 to 30 Hz, preferably between 15 to 25 Hz.

Subject matter of the present invention is in one embodiment of the invention a mechanochemical process, wherein the mechanochemical process is conducted at room temperature. Room temperature is a temperature 15 to 30° C., preferably 25° C.

Subject matter of the present invention is in one embodiment of the invention a mechanochemical process, wherein the mechanochemical process is conducted under atmospheric pressure. Atmospheric pressure means 900 to 1100 mbar, preferably 1013 mbar.

Subject matter of the present invention is in one embodiment of the invention a mechanochemical process, wherein the mechanochemical process is conducted under atmosphere. Atmosphere means oxygen containing atmosphere (air or oxygen/gas mixtures) or inert gas atmosphere (e. g. nitrogen, argon, xenon, etc.), preferably air.

Subject matter of the present invention is in one embodiment of the invention a mechanochemical process, wherein the mechanochemical process is conducted under dry or humid atmosphere. Humidity means atmosphere containing 0-70% relative humidity, preferably humidity of ambient air.

In one aspect the current invention is drawn to a mechanochemical process to convert at least a part of solid chemical substances or mixture thereof into the respective transformation products, the process being accomplished with chemically stimulating energy, in which an active reaction container is filled with a reaction mixture, the reaction mixture comprising said solid compound composition and at least one solid catalyst or solid catalytically active compound. Most preferably this mechanochemical process is for simulating or capturing the transformation over time of a solid pharmaceutical composition in a shortened time span and the respective degradation pathways. In one embodiment, this solid chemical substance is a solid pharmaceutical composition. This particular aspect of the current invention is also drawn to a mechanochemical process for simulating or capturing the transformation over time of a solid pharmaceutical composition in a shortened time span and the respective degradation pathways converting at least a part of solid chemical substances or mixture thereof into the respective degradation (or transformation) products, the process being accomplished with chemically stimulating energy in which an active reaction container is filled with a reaction mixture, the reaction mixture comprising said solid pharmaceutical composition. In the mechanochemical process at least one solid catalytically active compound is used. The solid compound composition is being brought in operative contact with at least a part of the active reaction container and then in contact with the at least one solid catalyst.

In essence, the invention thus also (in its origins) refers to a mechanochemical process to convert at least a part of one or more solid chemical substances or mixture thereof into the respective transformation products, wherein the process is being accomplished with chemically stimulating energy, in which an active reaction container is filled with a reaction mixture, the reaction mixture comprising said solid compound composition.

In a preferred embodiment of the mechanochemical process according to the invention the process is a substantially solvent-free process, more precisely in this residual solvents, crystalline solvates, water content as residual water or bound as hydrates comprised in the composition are not meant by the feature "solvent-free", thus meaning that a "substantially solvent-free process" is a process that is substantially free from additional solvent or solvent added during or before the process.

In a preferred embodiment of the mechanochemical process according to the invention the reaction mixture comprising said solid compound composition is substantially solvent-free. More precisely in this, residual solvents, crystalline solvates, water content as residual water or bound as hydrates comprised in the composition are not meant by the feature "solvent-free", thus meaning that a "substantially solvent-free process" is a process that is substantially free from additional solvent or solvent added during or before the process.

In the current invention "chemically stimulating energy" is defined and understood as any kind of energy that would be sufficient as activation energy to start a chemical reaction process. Most often this is mechanical derived energy (mechano-energy), but this energy could be provided from any source e.g. by raising the temperature or by kinetic energy like that provided by stirring processes, or it could be provided by an ultrasonic source etc. In a preferred embodiment the chemically stimulating energy is kinetic energy, preferably kinetic energy produced by a ball mill. In the process according to the invention the ball mill might then be considered as being the active reaction container and a ball of the ball mill might then be considered as being the part of the active reaction container. In another preferred embodiment the chemically stimulating energy is produced by an ultrasonic source.

The above-described processes maybe further used
  for predicting the stability of a API, excipient or API-excipient mixture
  for predicting the shelf-life of a formulation
  for predicting API-excipient compatibility
  for predicting degradation profiles of APIs, excipients and formulations
  for predicting of polymorph changes
  for predicting compatibility of packaging material In particular embodiments of the mechanochemical processes of the present invention the above outlined kits are used in said mechanochemical processes.

In a particular embodiment said kits may be used for any of the above outlined processes wherein said API is an API with carboxylic acid, sulfonic acid or esters thereof, preferably selected from the group comprising Clopidogrel bisulfate, acetyl salicylic acid, benzocaine, procaine, atropine, or is an APIs with prodrug esters (e.g. candesartan cilexetil, cefpodoxim proxetil, adefovir).

In a particular embodiment of the before-mentioned processes wherein said API is an API with carboxylic acid, sulfonic acid or esters thereof the kit comprises the following components:
  a container comprising a catalyst that is 3-15% (w/w) NaOH absorbed on silica gel, preferably 3-10% (w/w) NaOH absorbed on silica gel, more preferably about 5% NaOH on silica gel, and
  a container comprising a catalyst that is 3-15% (w/w) $KMnO_4$ absorbed on silica gel, preferably 3-10% (w/w) $KMnO_4$ absorbed on silica gel, more preferably about 5% $KMnO_4$ on silica gel In a particular embodiment of the before-mentioned processes wherein said API is an API with carboxylic acid, sulfonic acid or esters thereof the kit comprises the following components:
  a container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% sulfuric acid or chlorosulfonic acid on silica gel, and
  a container comprising a catalyst that is 3-15% (w/w) NaOH absorbed on silica gel, preferably 3-10% (w/w) NaOH absorbed on silica gel, more preferably about 5% NaOH on silica gel, and
  a container comprising a catalyst that is 3-15% (w/w) $KMnO_4$ absorbed on silica gel, preferably 3-10% (w/w) $KMnO_4$ absorbed on silica gel, more preferably about 5% $KMnO_4$ on silica gel, and
a container comprising a neutral catalyst that is pure silica gel 60 (70-230 mesh) or that is pure alox.

In a particular embodiment said kits maybe used for any of the above outlined processes wherein said API is an API with amide function, preferably selected from the group comprising Paracetamol, chloramphenicol, indomethacine, lidocaine.

In a particular embodiment of the before-mentioned processes wherein said API is an API with amide function the kit comprises the following components:
  a container comprising a catalyst that is 3-15% (w/w) NaOH absorbed on silica gel, preferably 3-10% (w/w) NaOH absorbed on silica gel, more preferably about 5% NaOH on silica gel, and
  a container comprising a catalyst that is 3-15% (w/w) $KMnO_4$ absorbed on silica gel, preferably 3-10% (w/w) $KMnO_4$ absorbed on silica gel, more preferably about 5% $KMnO_4$ on silica gel In a particular embodiment of the before-mentioned processes wherein said API is an API with amide function the kit comprises the following components:
  a container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% sulfuric acid or chlorosulfonic acid on silica gel, and
  a container comprising a catalyst that is 3-15% (w/w) NaOH absorbed on silica gel, preferably 3-10% (w/w) NaOH absorbed on silica gel, more preferably about 5% NaOH on silica gel, and
  a container comprising a catalyst that is 3-15% (w/w) $KMnO_4$ absorbed on silica gel, preferably 3-10% (w/w) $KMnO_4$ absorbed on silica gel, more preferably about 5% $KMnO_4$ on silica gel, and
  a container comprising a neutral catalyst that is pure silica gel 60 (70-230 mesh) or that is pure alox.

In a particular embodiment said kits maybe used for any of the above outlined processes wherein said API is an API with an amine function, preferably secondary or tertiary amines, selected from the group comprising citalopram, fluoxetine, primaquine, nifedipine, duloxetine. In a particular embodiment of the before-mentioned processes said API is an API with an amine function the kit comprises the following components:
  a container comprising a catalyst that is 3-15% (w/w) sulfuric acid absorbed on silica gel 60 (70-230 mesh), preferably 3-10% (w/w) sulfuric acid absorbed on silica gel, more preferably about 5% sulfuric acid on silica gel, and
  a container comprising a catalyst that is 3-15% (w/w) $KMnO_4$ absorbed on silica gel, preferably 3-10% (w/w) $KMnO_4$ absorbed on silica gel, more preferably about 5% $KMnO_4$ on silica gel In a particular embodiment of the before-mentioned processes said API is an API with an amine function the kit comprises the following components:
  a container comprising a catalyst that is 3-15% (w/w) sulfuric acid absorbed on silica gel 60 (70-230 mesh), preferably 3-10% (w/w) sulfuric acid absorbed on silica gel, more preferably about 5% sulfuric acid on silica gel, and
  a container comprising a catalyst that is 3-15% (w/w) NaOH absorbed on silica gel, preferably 3-10% (w/w) NaOH absorbed on silica gel, more preferably about 5% NaOH on silica gel, and
  a container comprising a catalyst that is 3-15% (w/w) $KMnO_4$ absorbed on silica gel or alox, preferably 3-10% (w/w) KMnO$_4$ absorbed on silica gel or alox, more preferably about 5% KMnO$_4$ on silica gel or alox, and a container comprising a neutral catalyst that is pure silica gel 60 (70-230 mesh) or that is pure alox.

In a particular embodiment said kits maybe used for any of the above outlined processes wherein said API is an API with hydroxyl function in form of an ester, ether, alcohol or phenol preferably selected from the group comprising diflunisal, paracetamol, epinephrine, quercetin, resveratrol, cholesterol. In a particular embodiment of the before-mentioned processses the kit comprises the following components:

- a container comprising a catalyst that is 3-15% (w/w) sulfuric acid absorbed on silica gel 60 (70-230 mesh), preferably 3-10% (w/w) sulfuric acid absorbed on silica gel, more preferably about 5% sulfuric acid on silica gel, and
- a container comprising a catalyst that is 3-15% (w/w) NaOH absorbed on silica gel, preferably 3-10% (w/w) NaOH absorbed on silica gel, more preferably about 5% NaOH on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% KMnO$_4$ on silica gel or alox, and
- a container comprising a neutral catalyst that is pure silica gel 60 (70-230 mesh) or that is pure alox.

In a particular embodiment said kits maybe used for any of the above outlined processes wherein said API is an API with unsaturated bonds, conjugated systems or aromatic systems preferably selected from the group comprising paracetamol, acetyl salicylic acid, resveratrol, colecalciferol, nifedipine, simvastatine. In a particular embodiment of the before-mentioned processes the kit comprises the following components:

- a container comprising a catalyst that is 3-15% (w/w) sulfuric acid absorbed on silica gel 60 (70-230 mesh), preferably 3-10% (w/w) sulfuric acid absorbed on silica gel, more preferably about 5% sulfuric acid on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% KMnO$_4$ on silica gel In a particular embodiment said kits maybe used for any of the above outlined processes wherein said API is an API with an indole ring, preferably selected from the group comprising indomethacine, serotonine, melatonine, strychnine, methylergometrine, lysergic acid.

In a particular embodiment of the before-mentioned processes wherein said API is an API with an indole ring the kit comprises the following components:

- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% KMnO$_4$ on silica gel In a particular embodiment of the before-mentioned processes wherein said API is an API with an indole ring the kit comprises the following components:

- a container comprising a catalyst that is 3-15% (w/w) sulfuric acid absorbed on silica gel 60 (70-230 mesh), preferably 3-10% (w/w) sulfuric acid absorbed on silica gel, more preferably about 5% sulfuric acid on silica gel, and
- a container comprising a catalyst that is 3-15% (w/w) NaOH absorbed on silica gel, preferably 3-10% (w/w) NaOH absorbed on silica gel, more preferably about 5% NaOH on silica gel, and
- a container comprising a catalyst that is 3-15% (w/w) KMnO$_4$ absorbed on silica gel or alox, preferably 3-10% (w/w) KMnO$_4$ absorbed on silica gel or alox, more preferably about 5% KMnO$_4$ on silica gel or alox, and
- a container comprising a neutral catalyst that is pure silica gel 60 (70-230 mesh) or that is pure alox.

In a particular embodiment said kits maybe used for any of the above outlined processes wherein said API is an API with barbituric acids (imides), preferably selected from the group comprising Phenobarbital, hexobarbital, amobarbital, pentobarbital.

In a particular embodiment of the before-mentioned processes wherein said API is an API with barbituric acids (imides) the kit comprises the following components:

- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel, and
- a container comprising a neutral catalyst that is pure silica gel 60 (70-230 mesh)

In a particular embodiment of the before-mentioned processes wherein said API is an API with barbituric acids (imides) the kit comprises the following components:

- a container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% sulfuric acid or chlorosulfonic acid on silica gel, and
- a container comprising a catalyst that is 3-15% (w/w) NaOH absorbed on silica gel, preferably 3-10% (w/w) NaOH absorbed on silica gel, more preferably about 5% NaOH on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel, and
- a container comprising a neutral catalyst that is pure silica gel 60 (70-230 mesh)

In a particular embodiment said kits maybe used for any of the above outlined processes wherein said API is a prazoles (various functional groups) selected from the group comprising Omeprazole, pantoprazole, rabeprazole, ilaprazole.

In a particular embodiment of the before-mentioned processes wherein said API is a prazoles (various functional groups) the kit comprises the following components:

- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid absorbed on silica gel, and
- a container comprising a catalyst that is 3-15% (w/w) NaOH absorbed on silica gel, preferably 3-10% (w/w) NaOH absorbed on silica gel, more preferably about 5% (w/w) NaOH on silica gel, and
- a container comprising a catalyst that is 3-15% (w/w) KMnO$_4$ absorbed on silica gel, preferably 3-10% (w/w)

KMnO$_4$ absorbed on silica gel, more preferably about 5% (w/w) KMnO$_4$ on silica gel In a particular embodiment of the before-mentioned processes wherein said API is a prazoles (various functional groups) the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid absorbed on silica gel, and
- a container comprising a catalyst that is 3-15% (w/w) NaOH absorbed on silica gel, preferably 3-10% (w/w) NaOH absorbed on silica gel, more preferably about 5% (w/w) NaOH on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel
- a container comprising a neutral catalyst that is pure silica gel 60 (70-230 mesh) or that is pure alox.

In a particular embodiment said kits maybe used for any of the above outlined processes wherein said API is a morphinane (various functional groups) selected from the group comprising Morphine, codeine, hydromorphone, naloxone).

In a particular embodiment of the before-mentioned processes wherein said API is a morphinane (various functional groups) the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel In a particular embodiment of the before-mentioned processes wherein said API is a morphinane (various functional groups the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) NaOH absorbed on silica gel, preferably 3-10% (w/w) NaOH absorbed on silica gel, more preferably about 5% NaOH on silica gel, and
- a container comprising a catalyst that is 3-15% (w/w) KMnO$_4$ absorbed on silica gel or alox, preferably 3-10% (w/w) KMnO$_4$ absorbed on silica gel or alox, more preferably about 5% (w/w) KMnO$_4$ on silica gel or alox, and
- a container comprising a neutral catalyst that is pure silica gel 60 (70-230 mesh) or that is pure alox.

In a particular embodiment said kits maybe used for any of the above outlined processes wherein said API is a ACE inhibitors (various functional groups) selected from the group comprising eg. captopril, ramipril, enalapril, Lisinopril.

In a particular embodiment of the before-mentioned processes wherein said API is a ACE inhibitors the kit comprises the following components:
- a container comprising a catalyst that is 3-15% (w/w) NaOH absorbed on silica gel, preferably 3-10% (w/w) NaOH absorbed on silica gel, more preferably about 5% (w/w) NaOH on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel In a particular embodiment of the before-mentioned processes wherein said API is a ACE inhibitors the kit comprises the following components:
- a container comprising a catalyst that is 3-15% (w/w) NaOH absorbed on silica gel, preferably 3-10% (w/w) NaOH absorbed on silica gel, more preferably about 5% (w/w) NaOH on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% (w/w) KMnO$_4$ on silica gel, and
- a container comprising a neutral catalyst that is pure silica gel 60 (70-230 mesh) or that is pure alox.

In a particular embodiment said kits maybe used for any of the above outlined processes and uses wherein said API is a statine (various functional groups) selected from the group comprising atorvastatine, fluvastatine, lovastatine, pravastatine, rosuvastatine, simvastatine.

In a particular embodiment of the before-mentioned processes wherein said API is a statine (various functional groups) the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) KMnO$_4$ absorbed on silica gel, preferably 3-10% (w/w) KMnO$_4$ absorbed on silica gel, more preferably about 5% KMnO$_4$ on silica gel In a particular embodiment of the before-mentioned processes wherein said API is a statine (various functional groups) the kit comprises the following components:
- a container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel, and
- a container comprising a catalyst that is 3-15% (w/w) NaOH absorbed on silica gel, preferably 3-10% (w/w) NaOH absorbed on silica gel, more preferably about 5% NaOH on silica gel, and
- a container comprising a catalyst that is 3-15% (w/w) KMnO$_4$ absorbed on silica gel or alox, preferably 3-10% (w/w) KMnO$_4$ absorbed on silica gel or alox, more preferably about 5% KMnO$_4$ on silica gel or alox, and
- a container comprising a neutral catalyst that is pure silica gel 60 (70-230 mesh) or that is pure alox.

Definitions

In the current invention a "mechanochemical process" is defined and understood as any chemical degradation and/or transformation process in which energy provided to the process—mostly the activation energy—is derived from a mechanical source or process.

In the current invention "solid compound composition" is defined and understood as any solid compound composition, most preferably a solid pharmaceutical composition. This solid pharmaceutical composition preferably comprises at least one API (an active pharmaceutical ingredient), or said in another way is being a solid composition consisting of at least one API. Most preferably the "solid compound composition" is a solid pharmaceutical composition comprising at least one API and at least one pharmaceutical excipient. In a preferred example is a solid pharmaceutical composition which is in form of a tablet, dragée, soft gelatin capsule, hard gelatin capsule, granulate, film tablet, effervescent tablet, solid dispersion, solid suspension or a powder.

In the current invention "respective degradation and/or transformation products" is/are defined and understood as the products that will be the result of any degradation and/or transformation process that will occur during or at the end of a transformation process of the respective solid compound composition. This would include interconversion of polymorphic forms of the solid compounds or re-crystallisation of crystalline compound and/or formation of hydrates and or salts, as well as the respective interaction product which occur due to the interaction of said solid compounds with chemicals in their immediate environment or in solid contact with them or the general reaction products that occur due to the chemical reaction of said solid compounds with chemicals in their immediate environment or in solid contact with them. Preferably, these "respective transformation products" are "respective degradation products".

In the current invention "respective transformation and/or degradation products" is defined and understood as the products that will occur during or at the end of the transformation and/or degradation process of the respective solid compound composition. It would also include polymorphs of the respective solid form transformations. In a narrower definition these are products that are derived from the compounds of said solid compound composition, respective transformation and/or degradation products. Preferably these products are being derived in a chemical reaction under the influence of oxidative conditions, reductive conditions, heat, humidic, acidic conditions, and/or alkaline conditions, preferably oxidative conditions, heat, acidic conditions, or alkaline conditions.

In the current invention "to convert at least a part of a solid compound composition into the respective degradation products" is defined and understood as that
  1 to 95 weight-%, 2 to 90 weight-%, 3 to 85 weight-%, 4 to 80 weight-% or 5-75 weight-%; or
  1 to 25 weight-5, 2 to 20 weight-%, or 3 to 15 weight-%; or
  more than 1 weight-%, more than 2.5 weight-%, more than 5 weight-%, more than 7.5 weight-% or more than 10 weight-%
of said "solid compound composition" is converted into said "respective transformation and/or degradation products".

In the current invention "mechanochemically stimulating energy" is defined and understood as any kind of energy that would be sufficient as activation energy to start a chemical reaction process. Most often this is mechanical derived energy, but this energy could be provided from any source e.g. by raising the temperature or by kinetic energy like that provided by stirring processes. In a preferred embodiment the chemically stimulating energy is kinetic energy, preferably kinetic energy produced by a ball mill as mechanoenergy. In the process according to the invention the ball mill might then be considered as being the active reaction container and a ball of the ball mill might then be considered as being the part of the active reaction container.

In the current invention "solid catalyst" is defined and understood in its broadest sense as a catalyst that is of solid form and retains this solid form during the process according to the invention consisting of an catalytically active principle bound on a solid inorganic and/or organic resin. In a preferred embodiment, the solid catalyst is either fixed to a solid substance or used together with a solid substance. This is the major aspect and the core definition of the solid catalyst is thus the combination of the solid substance acting as a carrier with a catalytically active load, loaded on the carrier which thus together form the "(solid) catalyst". Whenever a ratio is mentioned in connection with catalyst or solid catalyst it is meant the carrier (solid substance) plus (together with) the catalytically active substance(s) as a whole independent of loading of the catalytically active principle/resin ratio. This solid substance could for example be selected from silica, silicagel or alox (aluminium oxide). The catalysts are preferably selected from acidic solid phase catalysts, basic solid phase catalysts, or oxidative solid phase catalysts. Most preferably the acidic solid phase catalysts are selected from silica gel, sulfuric acid being absorbed on silica gel, trifluoro sulfonic acid absorbed on silica gel. In another most preferable example the basic solid phase catalysts is selected from alox, KOH, NaOH or $K_2CO_3$. Other basic solid phase catalysts seem to also be very beneficial. In another most preferable example the oxidative solid phase catalysts being selected from $KMnO_4$ on silica or alox, $Na_2CrO_7$ on silica or alox. In the definition the catalyst is either fixed to a solid substance or used together with a solid substance, preferably this comprises a metal. There, the solid substance might be selected from silica, silicagel or alox (aluminium-oxide) and also the metal might be selected from Fe, K, Cr, Mn, Co, Na. In examples of the "solid catalyst" is selected from $Fe(II)(BF_4)_2$, $KCrO_4$, $MnO_2$, $Fe_2O_3$, CoO, $KMnO_4$, $NaCr_2O_7$, or $NaCr_2O_7 \cdot 2H_2O$. It might be selected from $Fe(II)(BF_4)_2$ on silicagel, $KCrO_4$ on alox, $MnO_2$ on silicagel, $Fe_2O_3$ on silicagel, CoO on silicagel, $KMnO_4$ on alox, $NaCr_2O_7$ on alox, $NaCr_2O_7$ on silica, $NaCr_2O_7 \cdot 2$ $H_2O$+alox, or $NaCr_2O_7 \cdot 2H_2O$+silicagel. Most preferably this "solid catalyst" might be $KMnO_4$ on silica (dry), $KMnO_4$ on silica (39% $H_2O$), $KMnO_4$ on aluminium oxide (dry) or Silica sulfuric acid.

In the current invention "active reaction container" is defined and understood as any container able to allow said "mechanochemical process" to proceed within its physical boundaries, and/or able to contain said "reaction mixture" and/or able to transfer or allowing transferal of said "mechanochemically stimulating energy" to the mechanochemical process and/or "reaction mixture". Preferably, the "active reaction container" is a container able to allow said "mechanochemical process" to proceed within its physical boundaries, to contain said "reaction mixture" and to transfer or allowing transferal of said "mechanochemically stimulating energy" to the mechanochemical process and/or "reaction mixture". One of the most preferred examples of such an "active reaction container" would be a ball mill or potentially a mixer.

In the current invention "substantially solvent-free" is defined and understood as a composition/mixture comprising no or close to no additionally added solvent ("close to no" meaning less than 1 weight-% or <0.5 weight-% solvent per weight of the solid like said reaction mixture, said solid compound composition and/or said solid catalyst.

In the current invention "substantially solvent-free process" is defined and understood as a process in which each composition or mixture comprises no or close to no additionally added solvent ("close to no" meaning less than 1 weight-% or <0.5 weight-% solvent per weight of the solid like said reaction mixture, said solid compound composition and/or said solid catalyst.

In the current invention "operative contact" is defined and understood as a physical contact between said "solid compound composition" and at least a part of said "active reaction container" during the process (during operation of the container") by mixing and mechanochemically stimulating energy. In one preferred embodiment in which the "active reaction container" is a ball mill it signifies the physical contact between the solid compound composition with a ball of the ball mill or with a pedal or a blade if the container is a mixer. The mechanochemical process according to the invention wherein the reaction mixture consists of said solid compound composition and at least one solid catalyst, the catalyst optionally being either fixed to a solid substance or used together with a solid substance, the solid substance optionally being either silica, silicagel or alox.

Embodiments of the invention are listed below

1. Kit comprising the following components:
   Container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% (w/w) sulfuric acid or chlorosulfonic acid on silica gel, and/or
   Container comprising a catalyst that is 3-15% (w/w) KOH or NaOH absorbed on silica gel or alox, preferably 3-10% (w/w) KOH or NaOH absorbed on silica gel or alox, more preferably about 5% (w/w) KOH or NaOH on silica gel or alox, and
   Container comprising a catalyst that is 3-15% (w/w) $KMnO_4$ absorbed on silica gel or alox, preferably 3-10% (w/w) $KMnO_4$ absorbed on silica gel or alox, more preferably about 5% (w/w) $KMnO_4$ on silica gel or alox, and
   Optionally a container comprising a neutral catalyst that is pure silica gel 60 (70-230 mesh) or that is pure alox.

2. Kit according to embodiment 1 comprising the following components:
   Container comprising a catalyst that is 3-15% (w/w) sulfuric acid or chlorosulfonic acid absorbed on silica gel 60 (70-230 mesh), preferably 3-10% (w/w) sulfuric acid or chlorosulfonic acid absorbed on silica gel, more preferably about 5% (w/w) sulfuric acid or chlorosulfonic acid on silica gel, and
   Container comprising a catalyst that is 3-15% (w/w) KOH or NaOH absorbed on silica gel or alox, preferably 3-10% (w/w) KOH or NaOH absorbed on silica gel or alox, more preferably about 5% (w/w) KOH or NaOH on silica gel or alox, and
   Container comprising a catalyst that is 3-15% (w/w) $KMnO_4$ absorbed on silica gel or alox, preferably 3-10% (w/w) $KMnO_4$ absorbed on silica gel or alox, more preferably about 5% (w/w) $KMnO_4$ on silica gel or alox, and
   Container comprising a neutral catalyst that is pure silica gel 60 (70-230 mesh) or that is pure alox.

3. Kit according to embodiment 1 or 2 comprising the following component:
   Container comprising a catalyst that is 3-15% (w/w) $KMnO_4$ absorbed on alox, preferably 3-10% (w/w) $KMnO_4$ absorbed on alox, more preferably about 5% (w/w) $KMnO_4$ on alox.

4. Kit according to embodiment 1 or 2 comprising the following component:
   Container comprising a catalyst that is 3-15% (w/w) $KMnO_4$ absorbed on silica gel, preferably 3-10% (w/w) $KMnO_4$ absorbed on silica gel, more preferably about 5% (w/w) $KMnO_4$ on silica gel.

5. Kit according to embodiment 1 to 4 comprising the following component:
   Container comprising a catalyst that is 3-15% (w/w) NaOH absorbed on silica gel, preferably 3-10% (w/w) NaOH absorbed on silica gel, more preferably about 5% (w/w) NaOH on silica gel 6. Kit according to embodiment 1 to 4 comprising the following component:
   Container comprising a catalyst that is 3-15% (w/w) NaOH absorbed on alox, preferably 3-10% (w/w) NaOH absorbed on alox, more preferably about 5% (w/w) NaOH on alox 7. Kit according to embodiment 1 to 4 comprising the following component:
   Container comprising a catalyst that is 3-15% (w/w) KOH absorbed on silica gel, preferably 3-10% (w/w) KOH absorbed on silica gel, more preferably about 5% (w/w) KOH on silica gel.

8. Kit according to embodiment 1 to 4 comprising the following component:
   Container comprising a catalyst that is 3-15% (w/w) KOH absorbed on alox, preferably 3-10% (w/w) KOH absorbed on alox, more preferably about 5% (w/w) KOH on alox.

9. Kit according to embodiment 1-8 comprising the following component:
   Container comprising a catalyst that is 3-15% (w/w) sulfuric acid absorbed on silica gel 60 (70-230 mesh), preferably 3-10% (w/w) sulfuric acid absorbed on silica gel, more preferably about 5% (w/w) sulfuric acid on silica gel.

10. Kit according to embodiment 1-8 comprising the following component:
    Container comprising a catalyst that is 3-15% (w/w) chlorosulfonic acid absorbed on silica gel 60 (70-230 mesh), preferably 3-10% (w/w) chlorosulfonic acid absorbed on silica gel, more preferably about 5% (w/w) chlorosulfonic acid on silica gel.

11. Kit according to embodiment 1 to 10 additionally comprising the following components:
    Container comprising a catalyst that is 3-15% (w/w) $K_2Cr_2O_7$ absorbed on silica gel, preferably 3-10% (w/w) $K_2Cr_2O_7$ absorbed on silica gel, more preferably about 5% (w/w) $K_2Cr_2O_7$ on silica gel 12. Kit according to embodiment 1 to 10 additionally comprising the following components:
    Container comprising a catalyst that is 3-15% (w/w) $KMnO_4$ absorbed on silica gel or alox, preferably 3-10% (w/w) $KMnO_4$ absorbed on silica gel or alox, more preferably about 5% (w/w) $KMnO_4$ on silica gel or alox, and
    Container comprising a catalyst that is 3-15% (w/w) $K_2Cr_2O_7$ absorbed on silica gel, preferably 3-10% (w/w) $K_2Cr_2O_7$ absorbed on silica gel, more preferably about 5% (w/w) $K_2Cr_2O_7$ on silica gel 13. Kit according to embodiment 1 to 10 additionally comprising the following components:
    container comprising a neutral catalyst that is pure silica gel 60 (70-230 mesh) or that is pure alox 14. Use of a kit according to any of embodiment 1-13 in a mechanochemical process for simulating and predicting the resulting degradation products of a compound that is preferably a solid active pharmaceutical ingredient (API), preferably an API with an API or an excipient with an excipient, more preferably an API in combination with an excipient.

15. Use of a kit according to embodiment 1-13, preferably according to claims 3 and 4, wherein said API is an API with carboxylic acid, sulfonic acid or esters thereof, preferably selected from the group comprising Clopidogrel bisulfate, acetyl salicylic acid, benzocaine, procaine, atropine, APIs with prodrug esters (eg candesartan cilexetil, cefpodoxim proxetil, adefovir dipivoxil etc.)

16. Use of a kit according to embodiment 1-12, preferably according to claims 3 and 4, wherein said API is an API with amide function, preferably selected from the group comprising Paracetamol, chloramphenicol, indomethacine, lidocaine.

17. Use of a kit according to embodiment 1-13, preferably according to claims 4 and 6, wherein said API is an API with an amine function, preferably secondary or tertiary amines, selected from the group comprising citalopram, fluoxetine, primaquine, nifedipine, duloxetine.

18. Use of a kit according to embodiment 1-13, preferably according to claims 4 and 6, wherein said API is an API with hydroxyl function in form of an ester, ether, alcohol or phenol preferably selected from the group comprising diflunisal, paracetamol, epinephrine, quercetin, resveratrol, cholesterol etc.

19. Use of a kit according to embodiment 1-13, preferably according to claims 4 and 6, wherein said API is an API with unsaturated bonds, conjugated systems or aromatic systems preferably selected from the group comprising paracetamol, acetyl salicylic acid, resveratrol, colecalciferol, nifedipine, simvastatine.

20. Use of a kit according to embodiment 1-13, preferably according to claims 4 and 6, wherein said API is an API with an indole ring, preferably selected from the group comprising indomethacine, serotonine, melatonine, strychnine, methylergometrine, lysergic acid.

21. Use of a kit according to embodiment 1-13, preferably according to claims 3 and 4, wherein said API is an API with barbituric acids (imides), preferably selected from the group comprising Phenobarbital, hexobarbital, amobarbital, pentobarbital.

22. Use of a kit according to embodiment 1-13, preferably according to claims 3, 4 and 6, wherein said API is a prazoles (various functional groups) selected from the group comprising Omeprazole, pantoprazole, rabeprazole, ilaprazole.

23. Use of a kit according to embodiment 1-13, preferably according to claims 4 and 6, wherein said API is a morphinane (various functional groups) selected from the group comprising Morphine, codeine, hydromorphone, naloxone, etc.)

24. Use of a kit according to embodiment 1-13, preferably according to claims 3 and 4, wherein said API is ACE inhibitors (various functional groups) selected from the group comprising eg. captopril, ramipril, enalapril, Lisinopril, etc.

25. Use of a kit according to embodiment 1-13, preferably according to claims 4 and 6, wherein said API is a statine (various functional groups) selected from the group comprising atorvastatine, fluvastatine, lovastatine, pravastatine, rosuvastatine, simvastatine, etc.

26. Use of a kit according to embodiment 1-13, wherein said API is a high molecular compound, preferably a peptide or protein based API.

27. Use of a kit according to embodiment 1-13, wherein said excipient is a low molecular or high molecular compound, preferably an organic excipient.

28. Use of a kit according to embodiment 1-12, wherein said excipient is lactose.

29. Use of a kit according to embodiment 1-13, wherein said excipient is an aldehyde containing excipient (carbohydrates, esp. lactose, glucose).

30. Use of a kit according to embodiment 1-13, wherein said excipient is prone to contain or form peroxides, preferably selected from the group comprising PEG, Povidone, polysorbate, etc.

31. Use of a kit according to embodiment 1-13, wherein said excipient is a (semi-)liquid excipients, preferably selected from the group comprising PEG, polysorbate, fatty acids and derivatives, emulsifyer etc.

32. A mechanochemical process for simulating and predicting the transformation of a compound that is preferably a solid active pharmaceutical ingredient (API), preferably an API in combination with an excipient, in a shortened time span, into the respective degradation product comprising the following steps:
    Providing a kit according to any of embodiment 1-13,
    Exposing said compound that is preferably a solid active pharmaceutical ingredient (API), preferably an API in combination with an excipient, to said mechanochemical process, preferably a ball mill process, wherein the stoichiometric ratio of API: catalyst (weight stoichiometry) is 1:1 to 20, preferably about 1:10.
    Analyzing the degradation products.

33. A mechanochemical process according to embodiment 32, wherein the reaction time of said process is between 10-90 minutes.

34. A mechanochemical process according to embodiment 32 or 33, wherein the frequency of said ball mill is between 5 to 30 Hz, preferably between 15 to 25 Hz.

35. A mechanochemical process according to any of embodiment 32-34, wherein the mechanochemical process is conducted at room temperature.

36. A mechanochemical process according to any of embodiment 32-35, wherein the mechanochemical process is conducted under atmospheric pressure.

BRIEF DESCRIPTION OF THE DRAWINGS

Figures

The following is a brief description of the Figures:

FIG. 2 clearly shows, that the acidic degradation product (RT 15 min), that was detected in the literature after incubation of the API with an acidic stressor at 40° C./75% relative humidity for 3 months, could also be detected in the solid phase set-up after 60 minutes process time already. The identity of the degradation product was confirmed by corresponding retention time and mass spectrum.

Figure 1:
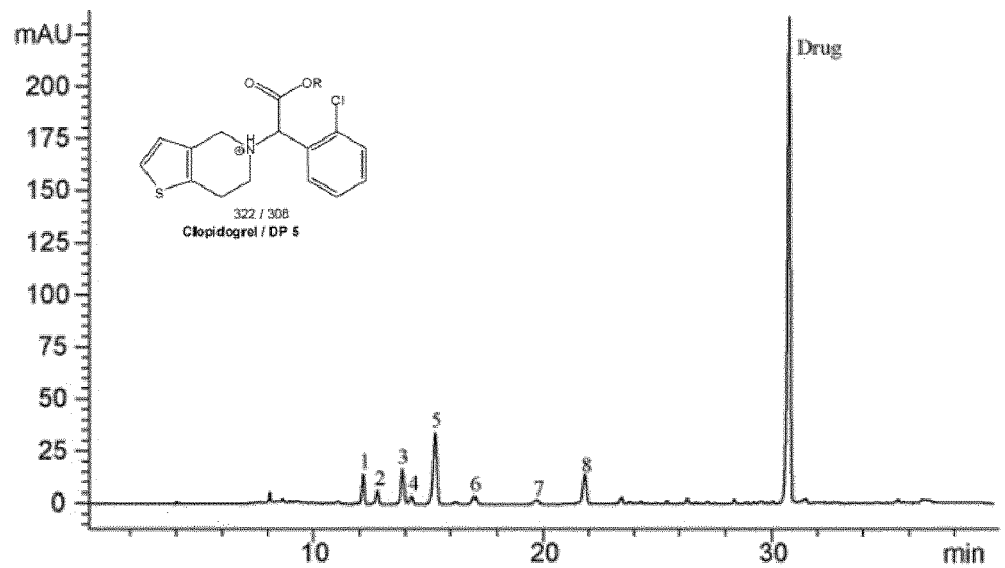
FIG. 1 is a chromatogram from J. Pharm. Biomed. Analysis 52 (2010) 332-344, "Characterization of degradation products of amorphous and polymorphic forms of clopidogrel bisulphate under solid state stress conditions". The chromatogram is showing the separation of degradation products formed in different solid forms under solid state stress conditions [DP—degradation product, A—acidic conditions, Al—alkaline conditions, N—neutral conditions (without stressor), P1—polymorph I, P2—polymorph II, and Am—amorphous form].

The invention was further illustrated by Examples.

EXAMPLES

Example 1: Proof of Concept

The first experiment was focused on a simple, well characterized API and other molecules with low structural complexity but with representative functional groups. They were systematically combined with a selection of potentially suitable catalysts. The solid phase reactions were initiated by ball milling for energy transfer in a controlled environment. In a first experimental set-up the oxidation in solid phase systems was analysed including a systematic evaluation of various catalysts, carrier matrices and reaction conditions.

The following analytical methods were implemented. Two solid phase oxidation reactions were prepared. The catalyst used was KMnO₄ on silica and the active reaction container was a ball mill. The result achieved was oxidation of 4-methoxybenzyl alcohol to yield p-anisaldehyd and diphenylsulfide to yield diphenylsulfoxide and diphenylsulfone, respectively. Based on the chemical structure, both oxidation products could be expected and were documented in literature as oxidative impurities, showing that the concept of the invention of initiating a degradation in a mechanochemical process did indeed work with an enormous reduction of the necessary time for doing so compared to the conventional method.

The degradation process is shown in the below structures:

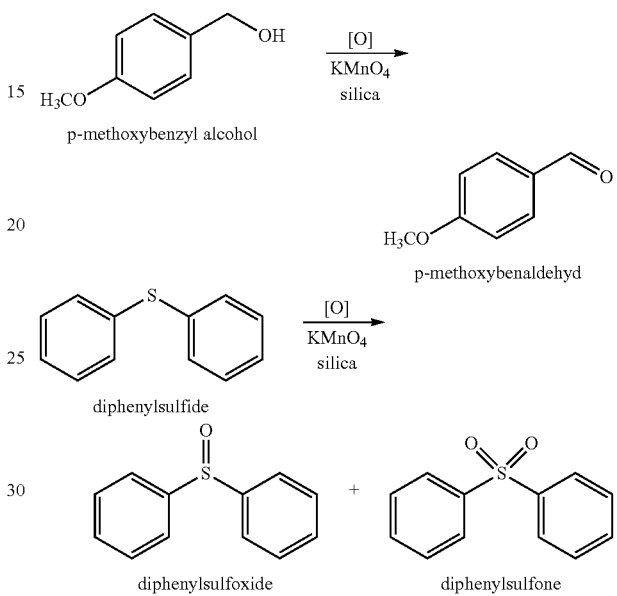

In another successful experimental set-up it could be demonstrated that differences in oxidation environment and oxidative power through varying catalysts could influence the reaction pathway and product, respectively. Thus, reaction of diphenylsulfide on aluminium oxide yielded solely the higher oxidation state product diphenyl sulfone, but no diphenylsulfoxide.

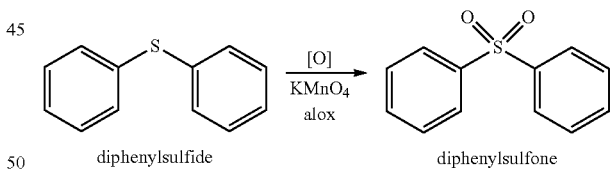

Additionally, it was possible to control the yield of oxidation products depending on the quality of the catalyst, thus higher yields could be obtained with traces of moisture (or solvent) within the catalyst indicating higher degradation rates of solid formulations caused by increased water content, storage in a high humidity environment or selection of inadequate primary packaging material.

Example 2: Selection of Catalytic Systems

The following catalysts were selected for future standard set-up of the solid phase reaction platform:
KMnO₄ on silica (dry)
KMnO₄ on silica (39% H₂O)
KMnO₄ on aluminium oxide (dry)
Silica sulfuric acid Example 3: Final Experimental Set-Up of a Solid Phase Prediction Platform A study with clopidogrel was initiated. For clopidogrel detailed data on degradation under thermolytic, acidic and alkaline conditions were available and hence, a benchmark comparison of both methods (literature vs. solid phase reaction platform) was executed. The below data were obtained from J. Pharm. Biomed. Analysis 52 (2010) 332-344, "Characterization of degradation products of amorphous and polymorphic forms of clopidogrel bisulphate under solid state stress conditions":

| | | | Generation of solid state stress samples. | | | | |
|---|---|---|---|---|---|---|---|
| | | | Replicate sample numbers | | | | |
| | | | Dark chamber study | | | Light chamber study | |
| | | | | | | HPLC analysis $1.2 \times 10^6$ lx h | |
| | | | HPLC analysis | | LC-MS | fluorescent light and | |
| pH effect | Additive | pH$^a$ | 1 month | 3 months | 3 months | 200 Wh/m$^2$ UV light | LC-MS |
| Without addtive | — | 2.7 | 3 | 3 | 1 | 3 | 1 |
| Acidic | Oxalic acid | 1.3 | 3 | 3 | 1 | 3 | 1 |
| Alkali | Sodium carbonate | 10.1 | 3 | 3 | 1 | 3 | 1 |

$^a$pH of the microenvironment was determined by the method given by Serajuddin et al. [18].

FIG. 1 stems from the same source and shows a chromatogram showing separation of degradation products formed in different solid forms under solid state stress conditions [DP—degradation product, A—acidic conditions, Al—alkaline conditions, N—neutral conditions (without stressor), P1—polymorph I, P2—polymorph II, and Am—amorphous form]. The part marked with "*" shows that only amorphous form leads to formation of DP-3 under neutral conditions.

To compare the results clopidogrel bisulfate was mixed with oxidative, acidic and alkaline solid phase catalysts, processed in a ball mill under standard conditions and the products were analysed by WAXS, DSC or HPLC-MS, respectively. For HPLC-MS, the analytical system from literature was transferred and implemented in the lab, accordingly, the solid phase reaction of clopidogrel bisulfate under various conditions could be compared to literature data as shown in the FIG. 2 etc.

Figure 2:
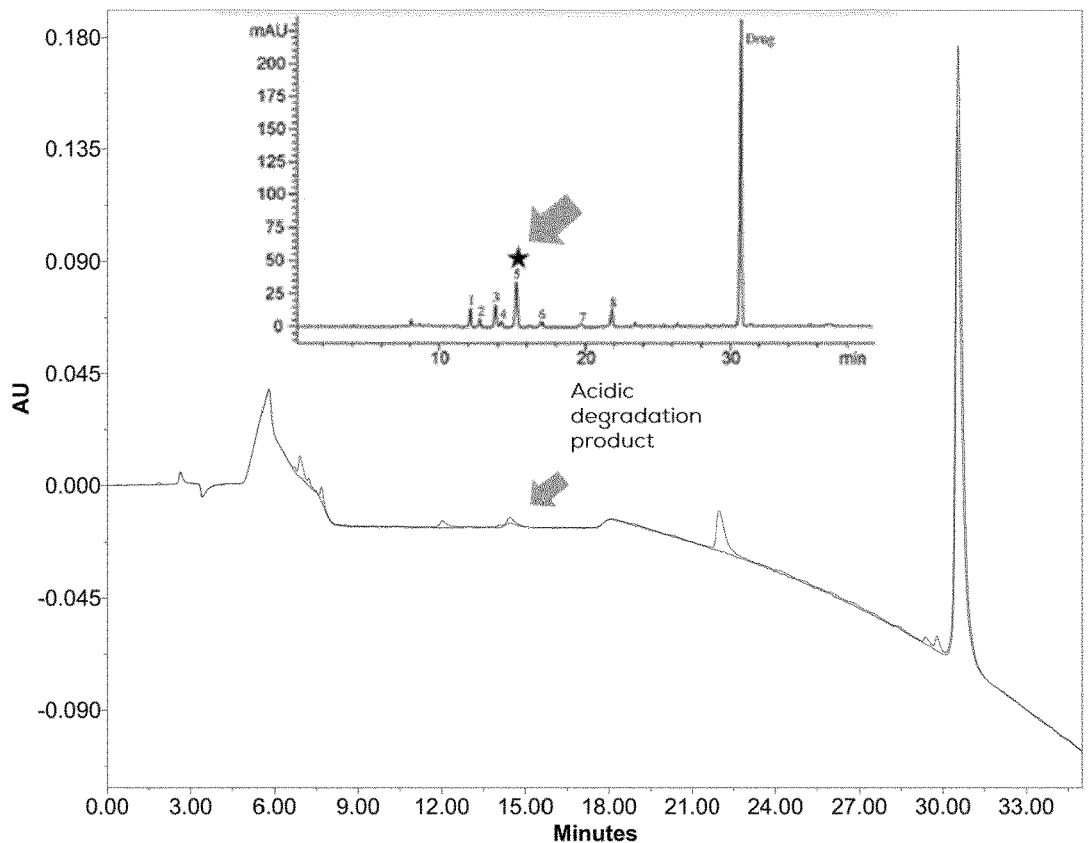
FIG. 2 shows a HPLC-chromatogram of clopidogrel bisulphate after milling reaction with an acidic solid phase catalyst.

FIG. 2 shows a HPLC-chromatogram of clopidogrel bisulphate after milling reaction with an acidic solid phase catalyst. FIG. 2 clearly shows, that the acidic degradation product (RT 15 min), that was detected in the literature after incubation of the API with an acidic stressor at 40° C./75% relative humidity for 3 months, could also be detected in the solid phase set-up after 60 minutes process time already. The identity of the degradation product was confirmed by corresponding retention time and mass spectrum.

Additionally, the quantity of degradation was compared between the conventional forced degradation conditions and the solid phase conditions showing a comparable amount after 60 minutes process time already. This is shown FIG. 3.

Figure 3:
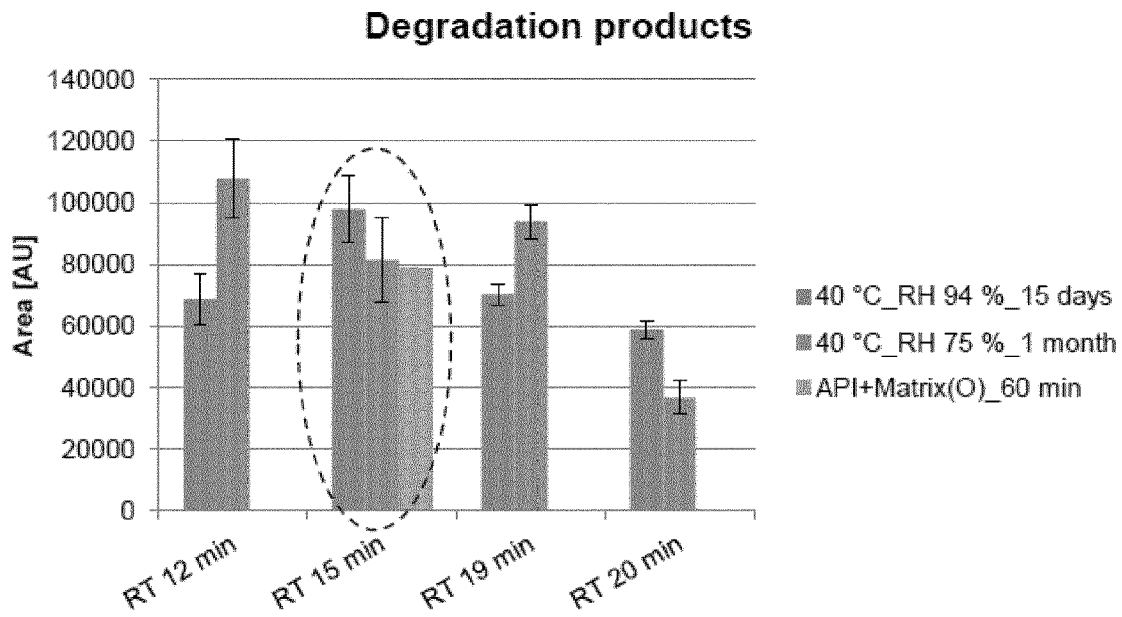
FIG. 3 is a comparison of acidic degradation (RT 15 min) under conventional and toolbox conditions, respectively, based on AUCs in the HPLC method.

FIG. 3 is a comparison of acidic degradation (at RT for 15 min) under conventional and solid state catalytic conditions, respectively, based on AUCs in the HPLC method.

Another experiment was set-up with clopidogrel and an oxidative solid phase catalyst (KMnO$_4$ on aluminium oxide, dry) to demonstrate oxidative degradation and time-dependency of degradation mechanism. The result is shown in FIG. 4.

Figure 4:
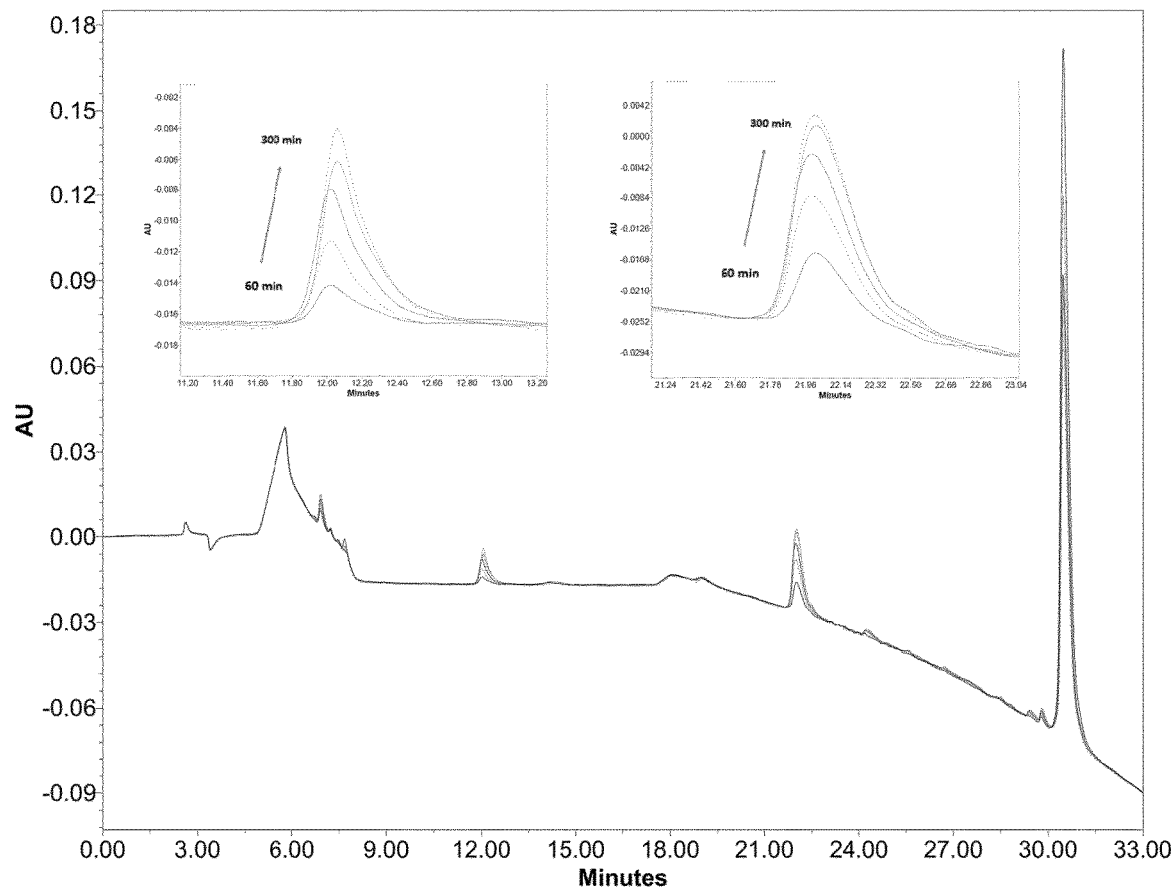
FIG. 4 shows a degradation of clopidogrel with oxidative solid phase catalyst (KMnO₄ on aluminium oxide, dry) with process times between 60 and 300 minutes. It clearly shows that there are two oxidative solid phase degradation products, but due to lack of literature data their structure and molecular weight could not be compared and confirmed. The product at retention time 12 min showed a molecular mass decreased by two mass units compared to the parent clopidogrel indicating a didehydro clodipogrel, which was reasonable and documented as an oxidized species under forced degradation conditions. However, no follow-up or second line degradation products occurred and the reaction showed a clear time-dependency following characteristic reaction kinetics.
Figure 4:
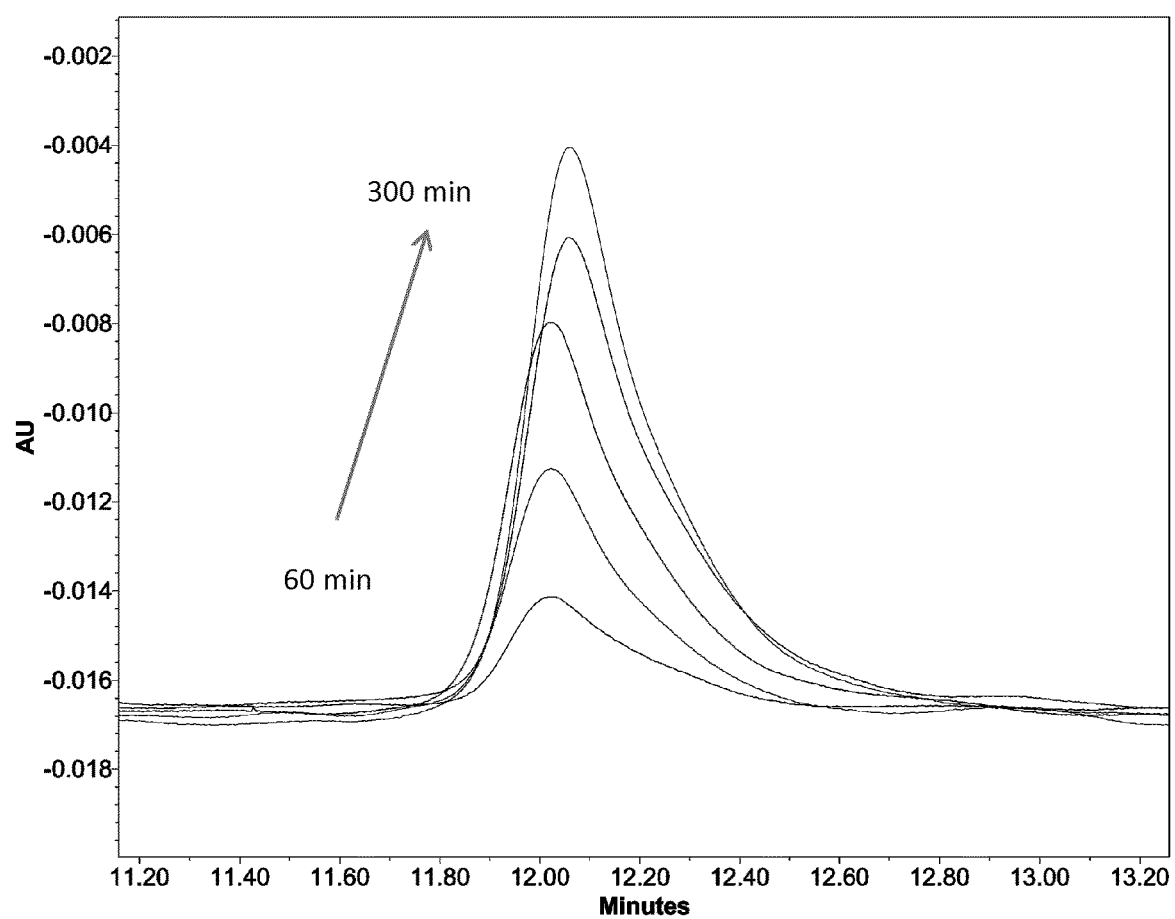
Figure 4:
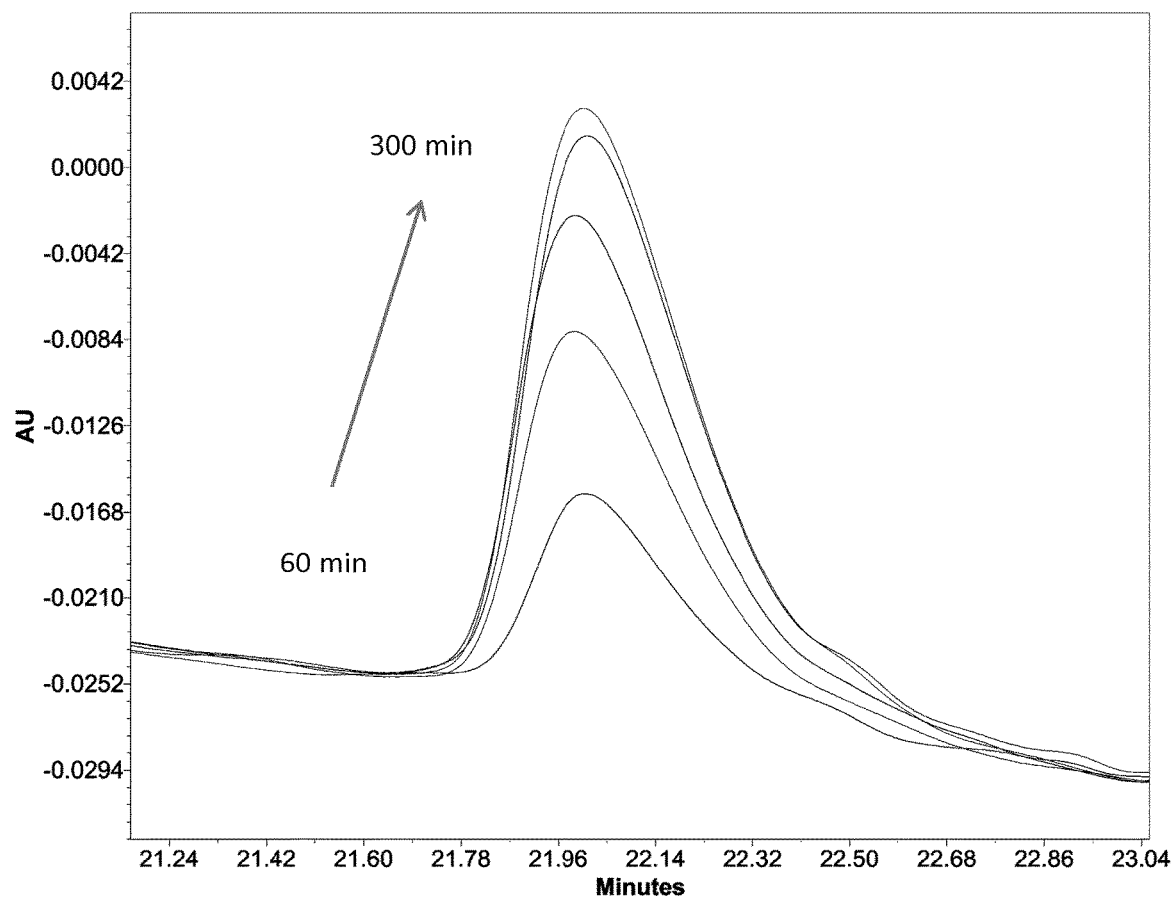

FIG. 4 shows a degradation of clopidogrel with oxidative solid phase catalyst (KMnO$_4$ on aluminium oxide, dry) with process times between 60 and 300 minutes.

FIG. 4 clearly shows that there are two oxidative solid phase degradation products, but due to lack of literature data their structure and molecular weight could not be compared and confirmed. The product at retention time 12 min. showed a molecular mass decreased by two mass units compared to the parent clopidogrel indicating a didehydro clodipogrel, which was reasonable and documented as an oxidized species under forced degradation conditions.

Undoubtedly, a clear and expected time-dependency of the reaction could be proven, since the product peaks increased with time, and no additional side-products or follow-up products were formed supporting the reliability of the method and data generated.

As documented in literature clopidogrel bisulphate exists in one amorphous and two polymorphic forms, polymorph II was used for the experiments described. To elucidate the stability and detect changes of the polymorphic form after energy input a simple experimental set-up with the API and no further additives was executed and the polymorphic form was analysed by WAXS (wide-angel X-ray scattering) and DSC (differential scanning calorimetry). The following FIGS. 5-7 demonstrate the applicability of the solid phase reaction platform to predict stability and changes of polymorphs based on DSC chromatograms.

Figure 5:
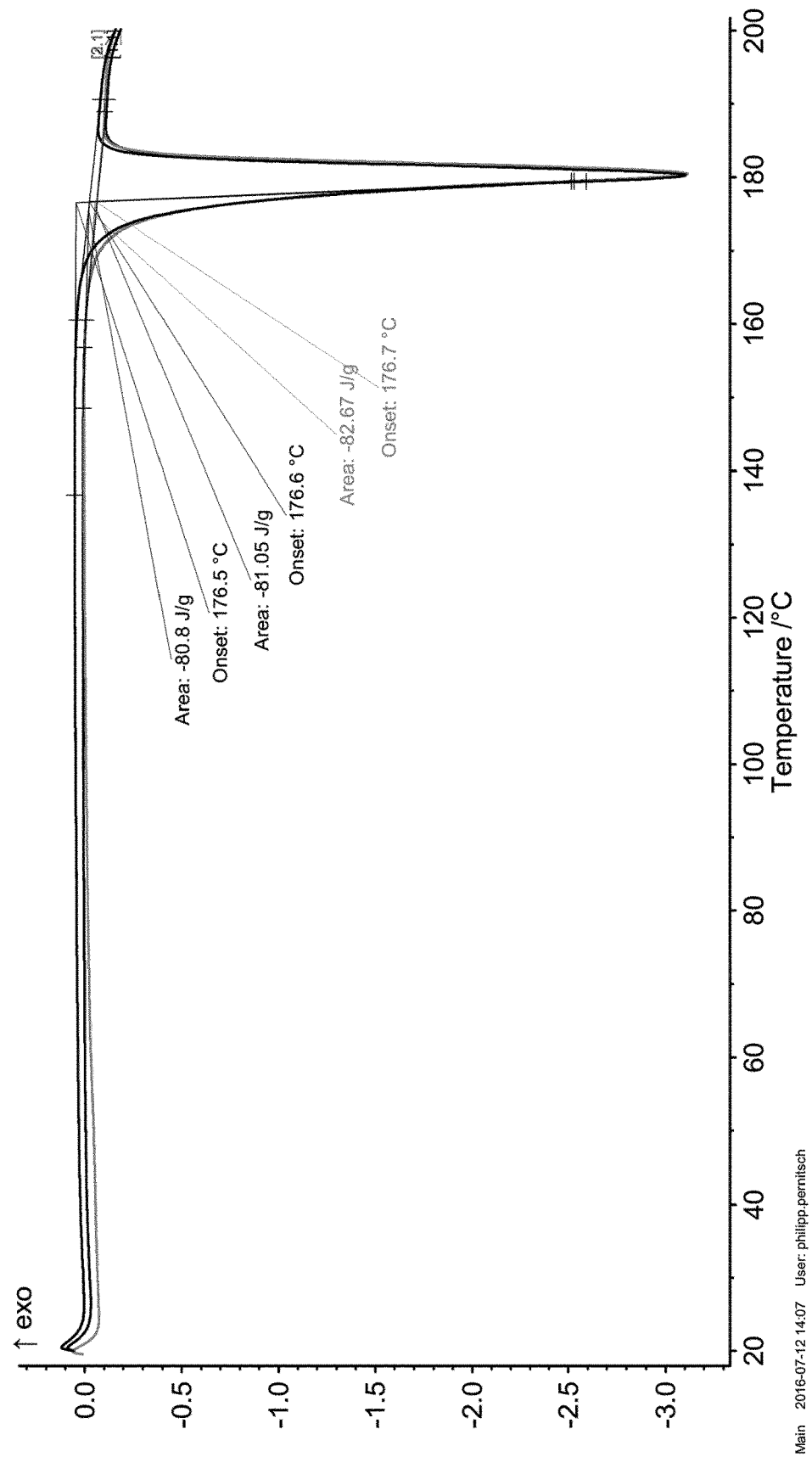
FIG. 5 shows a DSC profile of clopidogrel bisulphate polymorph II
Figure 6:
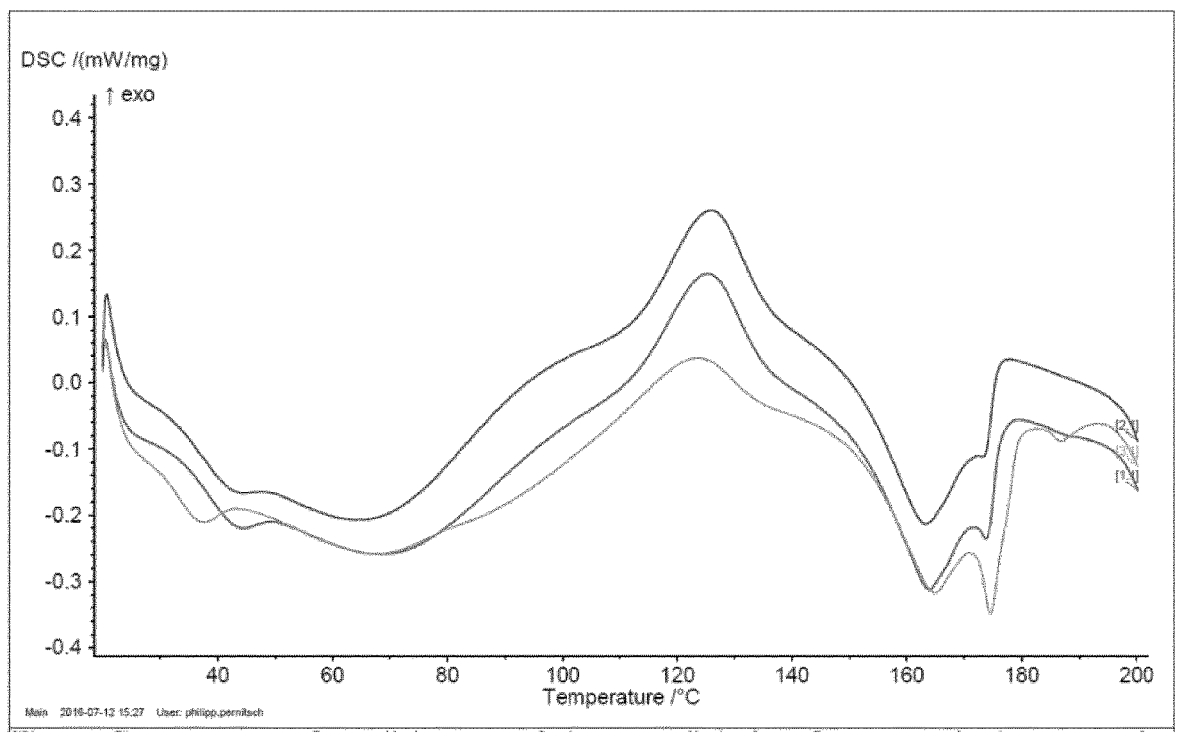
FIG. 6 shows DSC profile of clopidogrel bisulphate polymorph II after milling 25 Hz, 90 min. It shows, that an increased energy input with 25 Hz for 90 minutes lead to a change of the polymorphic form II to the amorphous state.
Figure 7:
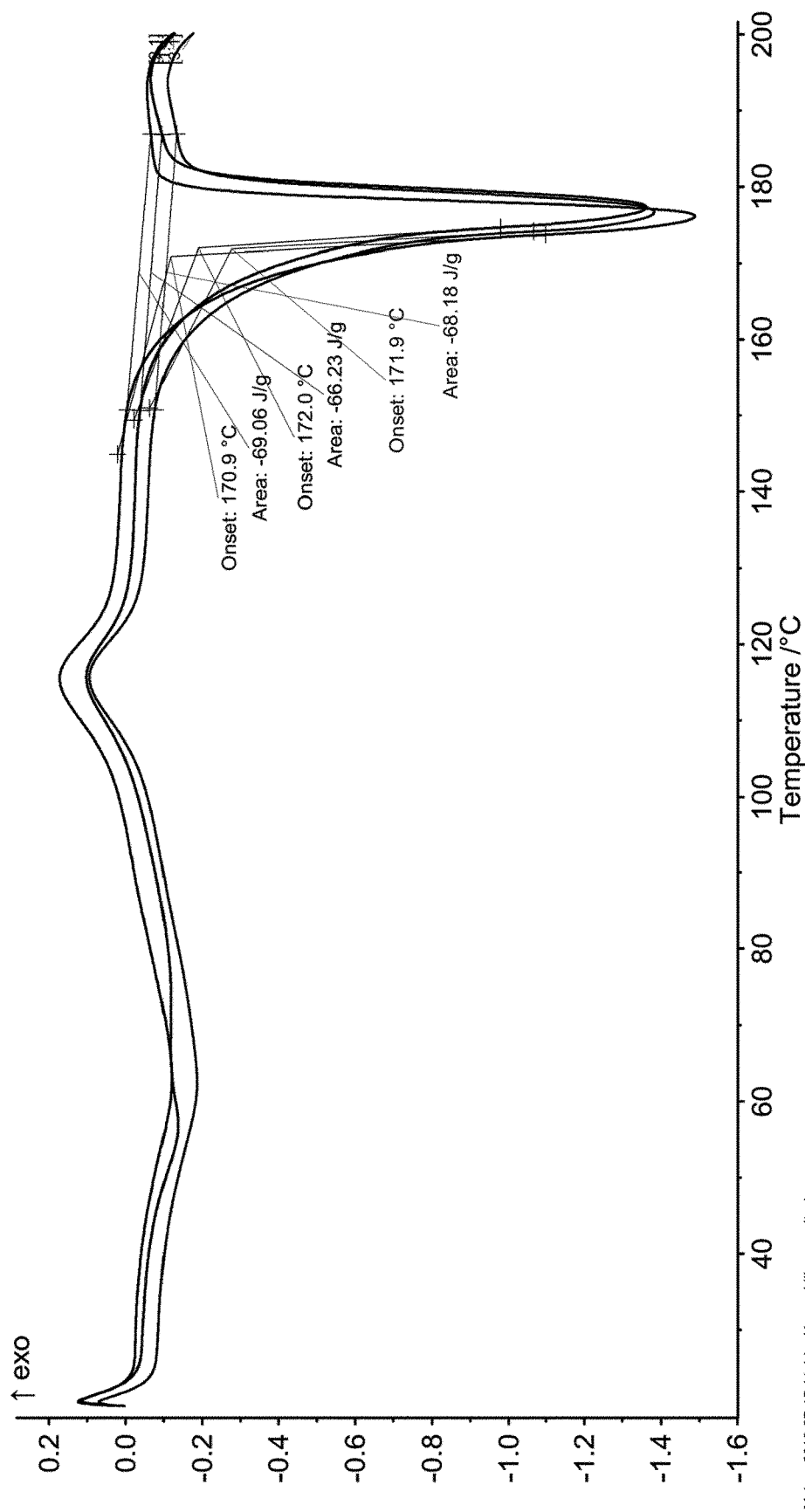
FIG. 7 shows a DSC profile of clopidogrel bisulphate polymorph II after milling 10 Hz, 90 min. It shows, that an energy input with 10 Hz for 90 minutes exhibited minor changes and higher stability compared to FIG. 6.

FIG. 5 shows the DSC profile of clopidogrel bisulphate polymorph II, FIG. 6 shows the DSC profile of clopidogrel bisulphate polymorph II after milling 25 Hz, 90 min and FIG. 7 shows the DSC profile of clopidogrel bisulphate polymorph II after milling 10 Hz, 90 min.

FIG. 6 clearly shows, that an increased energy input with 25 Hz for 90 minutes lead to a change of the polymorphic form II to the amorphous state, whereas FIG. 7 with 10 Hz for 90 minutes exhibited minor changes and higher stability. These experiments could be used to evaluate the stability of various polymorphic forms in general, but could also indicate the stability/instability during industrial processing and manufacturing.

Example 4: Test of the Robustness and Repeatability of Solid Phase Experiments To evaluate the reliability and robustness of the analytical method a "mini-validation" with 3 repetitions was performed.

TABLE 1

Data on linearity for concentrations between 100 μg/mL and 1000 μg/mL clopidogrel bisulphate

| Sample | conc [μg/ml] | Weigh 1 [mg] | Weigh 2 [mg] |
|---|---|---|---|
| W theoretical | | 20.00 | 20.00 |
| W ref. | | 20.29 | 20.19 |
| Faktor(W theoretical/W ref) | | 0.99 | 0.99 |
| Sample | conc [μg/ml] | Area | Area$_{korr}$ |
| STD 100 ug/ml | 100.00 | 437968 | 431708 |
| STD 100 ug/ml | 100.00 | 436821 | 430578 |
| STD 325 ug/ml | 325.00 | 1525713 | 1503906 |

TABLE 1-continued

Data on linearity for concentrations between 100 μg/mL and 1000 μg/mL clopidogrel bisulphate

| STD 325 ug/ml | 325.00 | 1527693 | 1505858 |
|---|---|---|---|
| STD 550 ug/ml | 550.00 | 2630248 | 2592655 |
| STD 550 ug/ml | 550.00 | 2635584 | 2597914 |
| STD 775 ug/ml | 775.00 | 3802708 | 3748352 |
| STD 775 ug/ml | 775.00 | 3741872 | 3688390 |
| STD 1000 ug/ml | 1000.00 | 4804286 | 4735620 |
| STD 1000 ug/ml | 1000.00 | 4783446 | 4715077 |
| slope | 4801 | | |
| intercept | −45458.6 | | |
| correlation coefficient ($R^2$) | 0.9998 | | |

Figure 8:
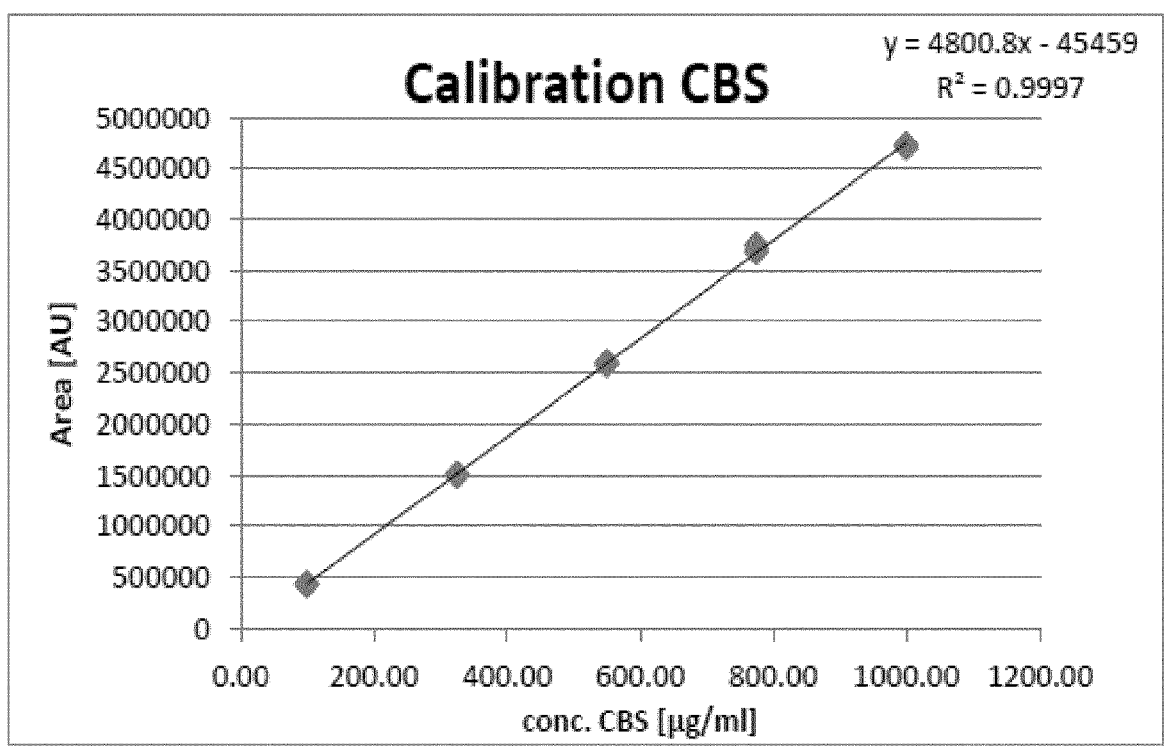
FIG. 8 shows the linearity data for clopidogrel bisulphate. It shows that the method had sufficient specificity to separate the API and its major degradation products at an area percent of >1% with a resolution factor of >1.5 for each peak.

FIG. 8 shows the linearity data for clopidogrel bisulphate. As shown the method had sufficient specificity to separate the API and its major degradation products at an area percent of >1% with a resolution factor of >1.5 for each peak.

Figure 9:
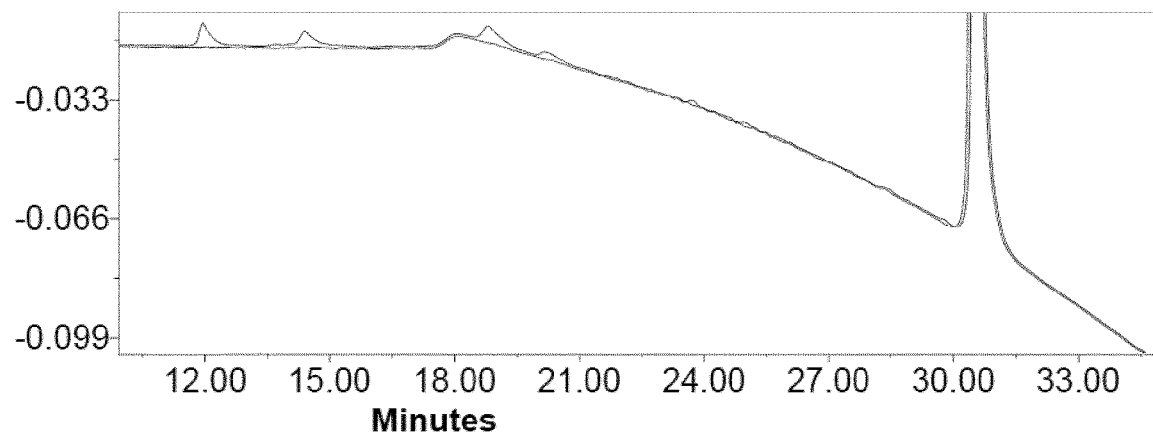
FIG. 9 shows a sample of clopidogrel bisulphate with alkaline stressor Na₂CO₃ stored at 40° C./94% RH for 15 days.

FIG. 9 shows a sample of clopidogrel bisulphate with alkaline stressor $Na_2CO_3$ stored at 40° C./94% RH for 15 days.

Figure 10:
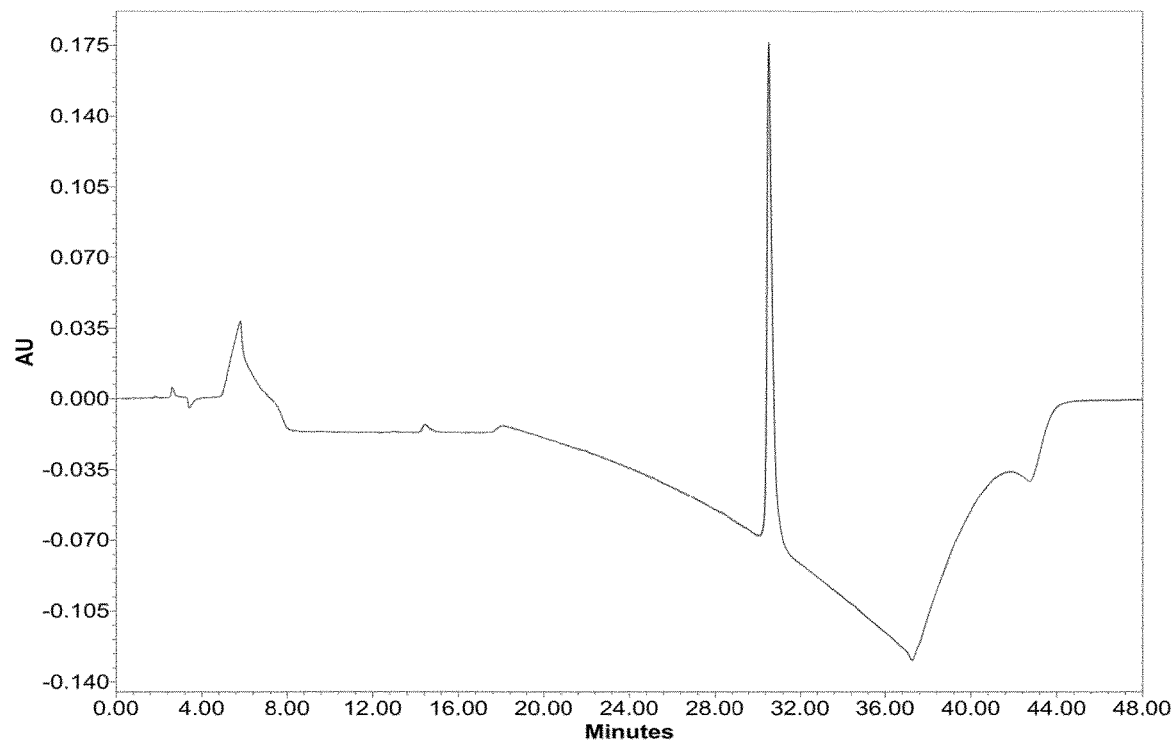
FIG. 10 shows an overlay of three injections of the oxidative sample after milling for 60 minutes at 25 Hz proving that the method delivered reliable and reproducible results.

The reproducibility of the HPLC method was tested by using a sample from the solid phase experiments with mechanochemical activation which was injected three times. It could be proven as shown in FIG. 10, that the method delivered reliable and reproducible results indicating the relevant differences in the tested samples. The same can be seen in Table 2. FIG. 10 shows an overlay of three injections of the oxidative sample after milling for 60 minutes at 25 Hz.

TABLE 2

Reproducibility of the HPLC method (peak areas of degradation products of 3 repetitions)

| Sample | Area | Area | Area | Area | Area | Area | Area | Area | Area |
|---|---|---|---|---|---|---|---|---|---|
| | API | RT 11.949 | RT 14.401 | RT 18.808 | RT 20.192 | RT 29.784 | | | |
| API + $Na_2CO_3$ | 4156530 | 104669 | 66062 | 89199 | 31025 | 5543 | | | |
| API + $Na_2CO_3$ | 4170985 | 104045 | 70535 | 97294 | 30680 | 6084 | | | |
| API + $Na_2CO_3$ | 4151008 | 107364 | 71851 | 98468 | 29592 | 4577 | | | |
| Mean | 4159508 | 105358 | 69483 | 94987 | 30432 | 5401 | | | |
| stdv (+/−) | 10316 | 1764 | 3035 | 5047 | 748 | 763 | | | |
| RSD [%] | 0.25 | 1.67 | 4.37 | 5.31 | 2.46 | 14.13 | | | |
| | API | RT 6.908 | RT 7.213 | RT 7.678 | RT 12.005 | RT 14.452 | RT 21.968 | RT 29.386 | RT 29.795 |
| N + API | 3833025 | 71476 | 12439 | 40747 | 30677 | 51828 | 344834 | 31251 | 49522 |
| N + API | 3808011 | 71145 | 11681 | 34730 | 36490 | 56604 | 326999 | 32128 | 51076 |
| N + API | 3817469 | 71593 | 11234 | 39508 | 40008 | 46291 | 344190 | 29532 | 49532 |
| Mean | 3819502 | 71405 | 11785 | 38328 | 35725 | 51574 | 338674 | 30970 | 50043 |
| stdv (+/−) | 12630 | 232 | 609 | 3177 | 4712 | 5161 | 10116 | 1321 | 894 |
| RSD [%] | 0.33 | 0.33 | 5.17 | 8.29 | 13.19 | 10.01 | 2.99 | 4.26 | 1.79 |
| | API | RT 14.424 | | | | | | | |
| O + API | 4409692 | 79403 | | | | | | | |
| O + API | 4398056 | 81197 | | | | | | | |
| O + API | 4397183 | 75577 | | | | | | | |
| Mean | 4401644 | 78726 | | | | | | | |
| stdv (+/−) | 6984 | 2871 | | | | | | | |
| RSD [%] | 0.16 | 3.65 | | | | | | | |

Figure 11:
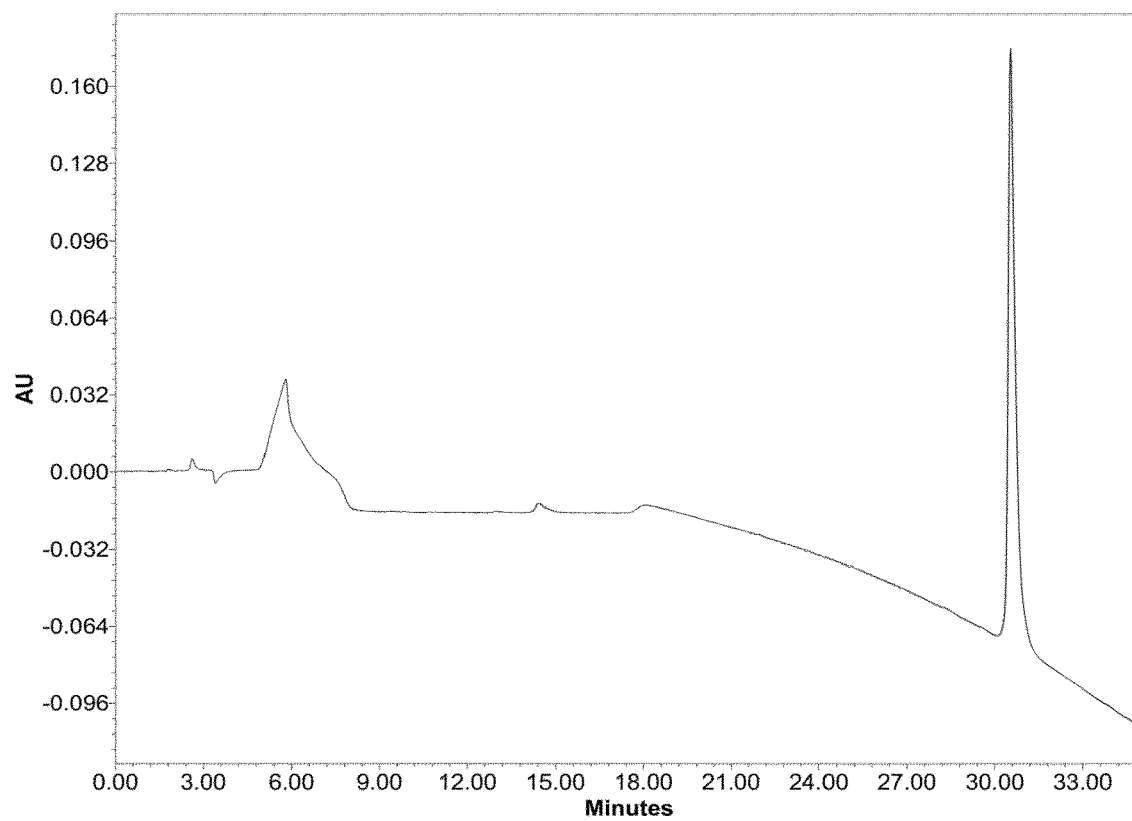
FIG. 11 shows an overlay of acidic solid phase samples of three independent milling experiments after 30 min at 25 Hz demonstrating the reproducibility of the milling experiments.
Figure 12:
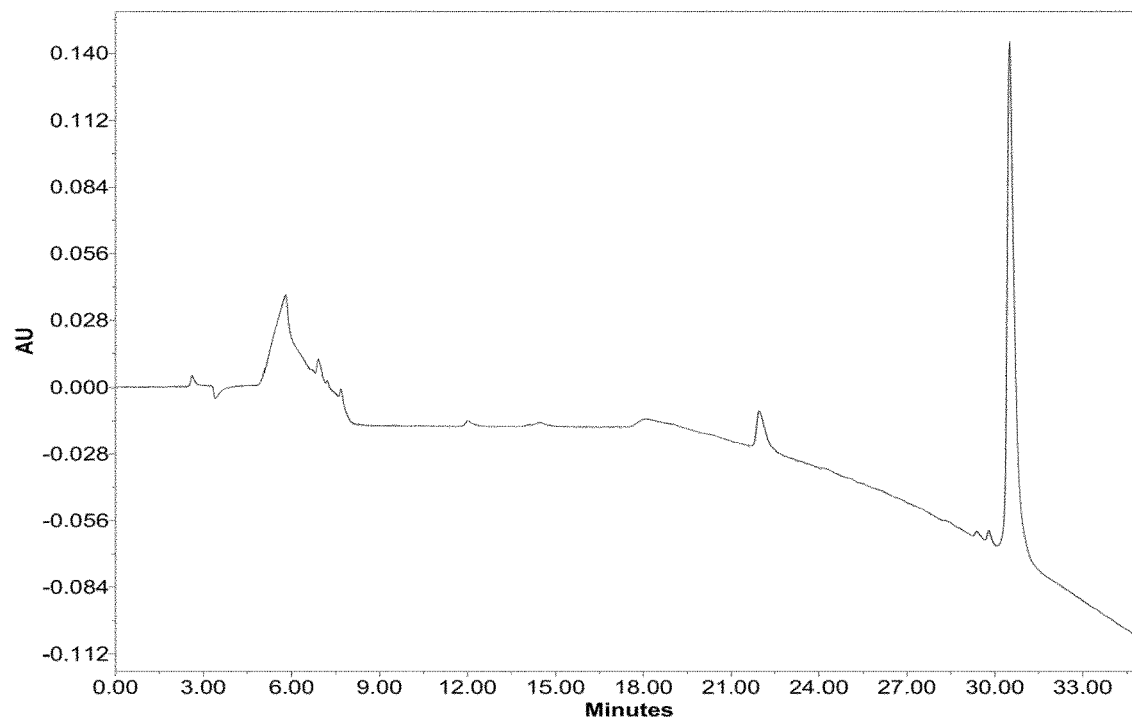
FIG. 12 shows an overlay of oxidative solid phase samples of three independent milling experiments after 30 min at 10 Hz demonstrating the reproducibility of the milling experiments.

Additionally, the reproducibility of the milling experiments was demonstrated for the acidic and the oxidative catalyst by comparing the individual chromatograms proving reliable and reproducible results as can be seen in FIGS. 11 and 12 as well as in Table 3.

FIG. 11 shows an overlay of acidic solid phase samples of three independent milling experiments after 30 min at 25 Hz.

FIG. 13 shows an overlay of oxidative solid phase samples of three independent milling experiments after 30 min at 10 Hz.

TABLE 3

Reproducibility test of milling method. Obtained peak areas of degradation products of 3 repetitive milling experiments

| Sample | Area | Area | Area | Area |
|---|---|---|---|---|
| | API | RT 14.653 | | |
| API + O | 4337968 | 108886 | | |
| API + O | 4412617 | 106293 | | |
| API + O | 4347670 | 105284 | | |
| | 4366085 | 106821 | | |
| | 40589 | 1858 | | |
| | 0.93 | 1.74 | | |
| | API | RT 6.889 | RT 11.845 | RT 21.849 |
| API + N | 3758087 | 59155 | 94478 | 321630 |
| API + N | 3648396 | 63931 | 87095 | 357103 |
| API + N | 3666035 | 56458 | 65619 | 316246 |
| | 3690839 | 58848 | 82397 | 331660 |
| | 58902 | 3784 | 14992 | 22198 |
| | 1.60 | 6.32 | 18.20 | 6.69 |

The invention claimed is:

1. A kit comprising one or more of the following embodiments (A) to (F):
   (A) a container comprising a catalyst that is 3-15% (w/w) sulfuric acid or chlorosulfonic acid absorbed on silica gel 60 (70-230 mesh), and a container comprising a catalyst that is 3-15% (w/w) KOH or NaOH absorbed on silica gel or alox;
   (B) a container a catalyst that is 3-15% (w/w) sulfuric acid or chlorosulfonic acid absorbed on silica gel 60 (70-230 mesh), and a container comprising a catalyst that is 3-15% (w/w) $KMnO_4$ absorbed on silica gel or alox; and/or
   (C) a container comprising a catalyst that is 3-15% (w/w) sulfuric acid or chlorosulfonic acid absorbed on silica gel 60 (70-230 mesh), and a container comprising a neutral catalyst that is pure silica gel 60 (70-230 mesh) or that is pure alox; and/or
   (D) a container comprising a catalyst that is 3-15% (w/w) KOH or NaOH absorbed on silica gel or alox, and a container comprising a catalyst that is 3-15% (w/w) $KMnO_4$ absorbed on silica gel or alox; and/or
   (E) a container comprising a catalyst that is 3-15% (w/w) KOH or NaOH absorbed on silica gel or alox, and a container comprising a neutral catalyst that is pure silica gel 60 (70-230 mesh) or that is pure alox; and/or
   (F) a container comprising a catalyst that is 3-15% (w/w) $KMnO_4$ absorbed on silica gel or alox, and a container comprising a neutral catalyst that is pure silica gel 60 (70-230 mesh) or that is pure alox.

2. The kit according to claim 1, wherein said kit comprises:
   the embodiment (A) of said container comprising a catalyst that is 3-15% (w/w) sulfuric acid or chlorosulfonic acid absorbed on silica gel 60 (70-230 mesh), and said container comprising a catalyst that is 3-15% (w/w) KOH or NaOH absorbed on silica gel or alox, and
   further comprises a container comprising a catalyst that is 3-15% (w/w) $KMnO_4$ absorbed on silica gel or alox, and a container comprising a neutral catalyst that is pure silica gel 60 (70-230 mesh) or that is pure alox.

3. A mechanochemical process for simulating and predicting the transformation of a compound into the respective degradation product, said process comprising:
   Providing a kit according to claim 1,
   Exposing said compound to a mechanochemical process, wherein the stoichiometric ratio of the compound:a catalyst (weight stoichiometry) is 1:1 to 20, and
   Analyzing the degradation products.

4. The mechanochemical process according to claim 3, wherein the reaction time of said process is between 10-90 minutes.

5. The mechanochemical process according to claim 3, wherein the mechanochemical process to which the compound is exposed is a ball mill process, wherein the frequency of said ball mill is between 5 to 30 Hz.

6. The mechanochemical process according to claim 3, wherein the mechanochemical process is conducted at room temperature.

7. The kit according to claim 1, wherein said kit comprises one or more of embodiments (A) to (C):
   (A) said container comprising a catalyst that is 3-15% (w/w) sulfuric acid or chlorosulfonic acid absorbed on silica gel 60 (70-230 mesh), and said container comprising a catalyst that is 3-15% (w/w) KOH or NaOH absorbed on silica gel or alox;
   (B) said container a catalyst that is 3-15% (w/w) sulfuric acid or chlorosulfonic acid absorbed on silica gel 60 (70-230 mesh), and said container comprising a catalyst that is 3-15% (w/w) $KMnO_4$ absorbed on silica gel or alox; and/or
   (C) said container comprising a catalyst that is 3-15% (w/w) sulfuric acid or chlorosulfonic acid absorbed on silica gel 60 (70-230 mesh), and said container comprising a neutral catalyst that is pure silica gel 60 (70-230 mesh) or that is pure alox.

8. The kit according to claim 1, wherein said kit comprises one or more of embodiments (D) and (E):
   (D) said container comprising a catalyst that is 3-15% (w/w) KOH or NaOH absorbed on silica gel or alox, and said container comprising a catalyst that is 3-15% (w/w) $KMnO_4$ absorbed on silica gel or alox; and/or
   (E) said container comprising a catalyst that is 3-15% (w/w) KOH or NaOH absorbed on silica gel or alox, and said container comprising a neutral catalyst that is pure silica gel 60 (70-230 mesh) or that is pure alox.

9. The kit according to claim 1, wherein said kit comprises the embodiment (F) of said container comprising a catalyst that is 3-15% (w/w) $KMnO_4$ absorbed on silica gel or alox, and said container comprising a neutral catalyst that is pure silica gel 60 (70-230 mesh) or that is pure alox.

10. The kit according to claim 1, wherein said kit comprises:
    the embodiment (A) of said container comprising a catalyst that is 3-15% (w/w) sulfuric acid or chlorosulfonic acid absorbed on silica gel 60 (70-230 mesh) and said container comprising said catalyst that is 3-15% (w/w) KOH or NaOH absorbed on silica gel or alox, and
    further comprises a container comprising a catalyst that is 3-15% (w/w) $KMnO_4$ absorbed on silica gel or alox;
    the embodiment (A) of said container comprising a catalyst that is 3-15% (w/w) sulfuric acid or chlorosulfonic acid absorbed on silica gel 60 (70-230 mesh) and said container comprising a catalyst that is 3-15% (w/w) KOH or NaOH absorbed on silica gel or alox, and further comprises a container comprising a neutral catalyst that is pure silica gel 60 (70-230 mesh) or that is pure alox; and/or the embodiment (D) of said container comprising a catalyst that is 3-15% (w/w) KOH or NaOH absorbed on silica gel or alox, and said container comprising a catalyst that is 3-15% (w/w) $KMnO_4$ absorbed on silica gel or alox, and further comprises a container comprising a neutral catalyst that is pure silica gel 60 (70-230 mesh) or that is pure alox.

11. A kit comprising the following components:

(a) a container comprising a catalyst that is 3-15% (w/w) sulfuric acid or chlorosulfonic acid absorbed on silica gel 60 (70-230 mesh), and/or (b) a container comprising a catalyst that is 3-15% (w/w) KOH or NaOH absorbed on silica gel or alox, and/or (c) a container comprising a catalyst that is 3-15% (w/w) $KMnO_4$ absorbed on silica gel or alox, and further comprising:

(i) a container comprising a catalyst that is 3-15% (w/w) $K_2Cr_2O_7$ absorbed on silica gel, (ii) a container comprising a catalyst that is 3-15% (w/w) $KMnO_4$ absorbed on silica gel or alox, and a container comprising a catalyst that is 3-15% (w/w) $K_2Cr_2O_7$ absorbed on silica gel, (iii) a container comprising a neutral catalyst that is pure silica gel 60 (70-230 mesh) or that is pure alox.

12. The kit according to claim 11, wherein said kit contains said container comprising a catalyst that is 3-15% (w/w) $K_2Cr_2O_7$ absorbed on silica gel, and optionally a container comprising a neutral catalyst that is pure silica gel 60 (70-230 mesh) or that is pure alox.

13. The kit according to claim 11, wherein said kit contains said container comprising a catalyst that is 3-15% (w/w) $KMnO_4$ absorbed on silica gel or alox, said container comprising a catalyst that is 3-15% (w/w) $K_2Cr_2O_7$ absorbed on silica gel, and optionally a container comprising a neutral catalyst that is pure silica gel 60 (70-230 mesh) or that is pure alox.

14. The kit according to claim 11, wherein said kit contains said container comprising a neutral catalyst that is pure silica gel 60 (70-230 mesh) or that is pure alox.

\* \* \* \* \*